United States Patent
Wolberg et al.

(10) Patent No.: US 12,008,726 B2
(45) Date of Patent: Jun. 11, 2024

(54) SYSTEM AND METHODS FOR PROVIDING A PICTURE FRAME WITH AN INTERACTIVE EXPERIENCE

(71) Applicant: Vizilu, Inc., Woodmere, NY (US)

(72) Inventors: George Wolberg, Woodmere, NY (US); Jeffrey Wolberg, Woodmere, NY (US); Siavash Zokai, Jackson Heights, NY (US)

(73) Assignee: Vizilu, Inc., Woodmere, NY (US)

(*) Notice: Subject to any disclaimer, the term of this patent is extended or adjusted under 35 U.S.C. 154(b) by 158 days.

(21) Appl. No.: 17/943,381

(22) Filed: Sep. 13, 2022

(65) Prior Publication Data
US 2024/0095875 A1    Mar. 21, 2024

(51) Int. Cl.
*G06T 3/00* (2024.01)
*A47G 1/06* (2006.01)
*G06T 3/08* (2024.01)
*G06T 3/18* (2024.01)

(52) U.S. Cl.
CPC .............. *G06T 3/08* (2024.01); *A47G 1/06* (2013.01); *G06T 3/18* (2024.01); *A47G 2001/0672* (2013.01)

(58) Field of Classification Search
None
See application file for complete search history.

(56) References Cited

U.S. PATENT DOCUMENTS

| | | | |
|---|---|---|---|
| 6,306,479 B1 | 10/2001 | Feiertag | |
| 8,336,238 B1 | 12/2012 | Hines | |
| 8,584,414 B1 | 11/2013 | Hines | |
| 2009/0189916 A1* | 7/2009 | Tsai | G06T 17/20 345/647 |
| 2010/0321575 A1* | 12/2010 | Huang | G06T 13/80 348/569 |
| 2013/0212918 A1 | 8/2013 | Pangborn | |

OTHER PUBLICATIONS

Papathomas et al, 'Hughes's Reverspectives: Radical Uses of Linear Perspective on Non-Coplanar Surfaces', Vision. (Year: 2019).*

(Continued)

*Primary Examiner* — Patrick F Valdez
(74) *Attorney, Agent, or Firm* — Fish & Richardson P.C.

(57) ABSTRACT

Implementations provide method that includes: accessing data encoding the one or more images sized and shaped for presentation on a square or rectangular surface; providing the first set of data for warping by one or more computer processors such that each of the one or more images is projected onto a respective trapezoidal surface having a first base and a second base that is longer than the first base, wherein the first base is arranged to be closer to a viewer than the second base, and wherein a first portion of each image is projected further away from the viewer than a second portion of each image; and presenting each of the projected one or more images on the respective trapezoidal surface, wherein the first portion of each projected image is presented by the first base and the second portion of each projected image is presented by the second base.

20 Claims, 24 Drawing Sheets

(56) References Cited

OTHER PUBLICATIONS

Dobias et al, 'The role of linear perspective cues on the perceived depth magnitude of the surfaces they are painted on: Proper-, reverse-, and flat-perspective paintings', Perception, vol. 43, pp. 989-1000. (Year: 2014).*
Digital Image Warping, 1st ed., Wolberg, Aug. 1990, 167 pages.
Papathomas et al., "Perspective-Based Illusory Movement in a Flat Billboard—An Explanation," Perception, Jan. 2010, 39(8): 1086-1093.
Papathomas, "Innovating perspective: Illustrating object and image superiority over surfaces," In: A New Perspective, 1st ed., Hughes (ed)., 2014, pp. 58-63.
Space, Time, and Presence in the Icon: Seeing the World with the Eyes of God, 1st ed., Hart et al. (ed)., Jan. 2010, 204 pages.

\* cited by examiner

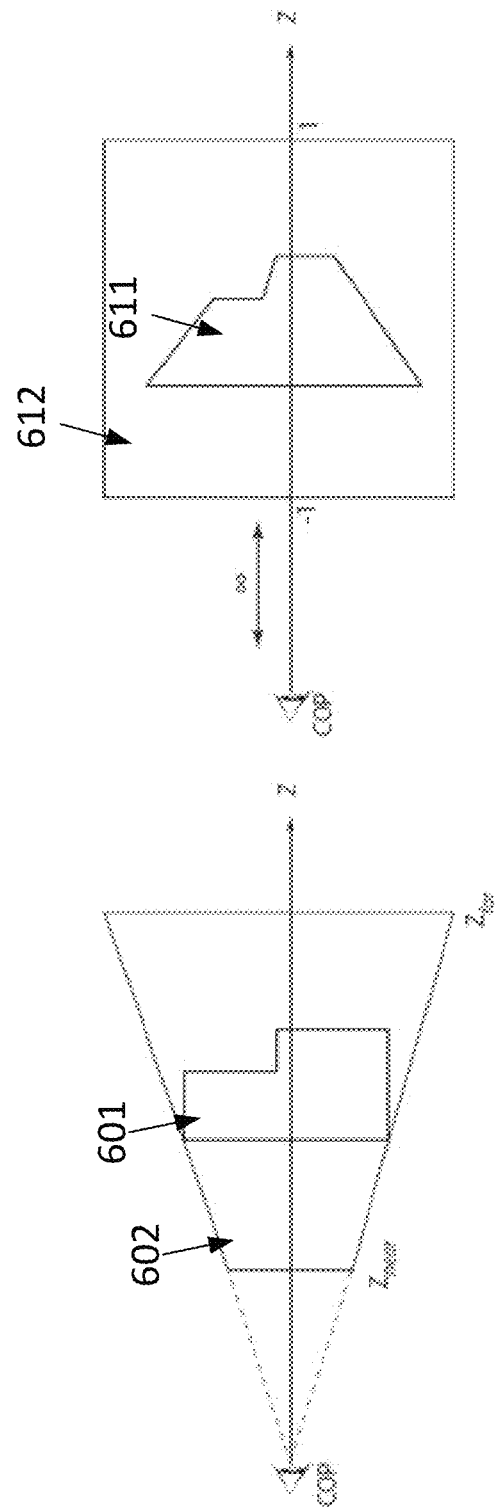
FIG. 6B
FIG. 6A

SYSTEM AND METHODS FOR PROVIDING A PICTURE FRAME WITH AN INTERACTIVE EXPERIENCE

This disclosure generally relates to picture frames.

BACKGROUND

Picture frames have historically functioned for protective and decorative purposes over many centuries. While the earliest physical frame was found in an Egyptian tomb dating back to CE 50-70, the decorative role of frames did not become prominent until the 12th and 13th centuries with the rise of hand-carved wooden frames. During this period, elaborate frames were used to adorn church decor and provide borders that separate the different paintings and sections within the sanctuary. In the centuries that followed, styles had changed but the role of the frame remained to serve as a transition between the painting and the surroundings while at the same time enhancing the artwork.

SUMMARY

In one aspect, the present disclosure describes a method for creating a perceived motion when one or more images are viewed between a first viewing angle and a second viewing angle, the method including: accessing a first set of data encoding the one or more images sized and shaped for presentation on a square or rectangular surface; providing the first set of data for warping by one or more computer processors such that each of the one or more images is projected onto a respective trapezoidal surface having a first base and a second base that is longer than the first base, wherein the first base is arranged to be closer to a viewer than the second base, and wherein a first portion of each image is projected further away from the viewer than a second portion of each image; and presenting each of the projected one or more images on the respective trapezoidal surface, wherein the first portion of each projected image is presented by the first base and the second portion of each projected image is presented by the second base even though the first portion of each projected image is further away than the second portion of each projected image, and wherein when the projected one or more images are viewed between the first viewing angle and the second viewing angle, the projected one or more images appear with the perceived motion even though each of the projected one or more images is static.

Implementations may include one or more of the following features.

The method may additionally include: accessing a second set of data encoding each of the projected one or more images for presentation on the respective trapezoidal surface. Presenting each of the projected one or more images may include: providing the second set of data for printing such that each of the projected one or more images is printed as a respective printout; and mounting each respective printout on a corresponding trapezoidal surface. Presenting each of the projected one or more images may include: displaying each of the projected one or more images as a digital image on the respective trapezoidal surface. Providing the first set of data for warping may include: submitting the first set of data to one of: a server, or a mobile app. The warping may include: causing the one or more processors to perform a transformation that projects each of the one or more images from the square or rectangular surface to the respective trapezoidal surface. The respective trapezoidal surface for each of the projected one or more images may be sized and shaped to represent portions of a scene where each of the projected one or more images is presented to the viewer.

In another aspect, the present disclosure describes a method for creating a perceived motion when one or more images are viewed between a first viewing angle and a second viewing angle, the method including: accessing a first set of data encoding the one or more images sized and shaped for presentation on a square or rectangular surface; warping the first set of data such that each of the one or more images is projected onto a respective trapezoidal surface having a first base and a second base that is longer than the first base, wherein the first base is arranged to be closer to a viewer than the second base, and wherein a first portion of each image is projected further away from the viewer than a second portion of the image; generating a second set of data encoding each of projected one or more images; and providing the second set of data for presenting each of the projected one or more images on the respective trapezoidal surface.

Implementations may include one or more of the following features.

Providing the second set of data may include: transmitting, to a user device, the second set of data; causing an operator of the user device to present each of the projected one or more images on the respective trapezoidal surface, wherein the first portion of each projected image is presented by the first base and the second portion of each projected image is presented by the second base even though the first portion of each projected image is further away than the second portion of each projected image, and wherein when the projected one or more images are viewed between the first viewing angle and the second viewing angle, the projected one or more images appear with the perceived motion even though each of the projected one or more images is static. Providing the second set of data for presenting may include: printing each of the projected one or more images as a respective print-out; and mounting each respective print-out on a corresponding trapezoidal surface. The warping may include: performing, using one or more computer processors, a perspective transformation that projects each of the one or more images from the square or rectangular surface to the respective trapezoidal surface. Accessing the first set of data may include: receiving, at the one or more processors and from a user device, the first set of data. The method may further include: configuring the respective trapezoidal surface for each of the projected one or more images to represent portions of a scene where each of the projected one or more images is presented to the viewer. Each of the projected one or more images may be one of: a digital image, or a physical photograph.

In yet another implementation, the present disclosure describes a picture frame for creating a perceived motion when one or more images are viewed between a first viewing angle and a second viewing angle, the picture frame including: at least one trapezoidal surface, each having a first base and a second base, wherein each trapezoidal surface is sized and shaped to present a corresponding one of the one or more images projected thereon, wherein the first base of each trapezoidal surface is arranged to be closer to a viewer than the second base of each trapezoidal surface, wherein a first portion of the corresponding one of the projected one or more images is further away from the viewer than a second portion of the corresponding one of the projected one or more images, and wherein the first portion of the corresponding one of the projected one or more images is presented by the first base and the second portion of the corresponding one of the projected one or more images is presented by the second base even though the first portion of the corresponding one of the projected one or more images is further away than the second portion of the corresponding one of the projected one or more images such that when the projected one or more images are viewed between the first viewing angle and the second viewing angle, the projected one or more images appear with the perceived motion even though each of the projected one or more images is static.

Implementations may include one or more of the following features.

The picture frame may be sized and shaped to represent a scene where the projected one or more images are presented to the viewer. The scene may include: at least one framed panel, each framed panel incorporating a corresponding one of the at least one trapezoidal surface; and at least one region representing an intervening structure, wherein the intervening structure is further away from the viewer than the first portion of the corresponding one of the projected one or more images, wherein the intervening structure is presented on a flat surface closer to the viewer than the first portion of the corresponding one of the projected one or more images, and wherein the at least one trapezoidal surface is not co-planar with respect to the flat surface of the intervening structure.

Implementations may include one or more of the following features.

Each of the projected one or more images may be mounted on a corresponding one of the at least one trapezoidal surface such that a front side of each of the projected one or more images faces the viewer. The at least one trapezoidal surface may include metal dots so that the corresponding one of the projected one or more images can be mounted using one or more magnets from a back side of the corresponding one of the projected one or more images. The at least one trapezoidal surface may include more than one trapezoidal surfaces. At least one of the more than one trapezoidal surfaces may not be co-planar with respect to another of the more than one trapezoidal surfaces.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

FIGS. 6A and 6B illustrate an example of transforming a frustum into a cube, as incorporated by some implementations of the present disclosure.

Like reference numbers and designations in the various drawings indicate like elements.

DETAILED DESCRIPTION

Figure 1:
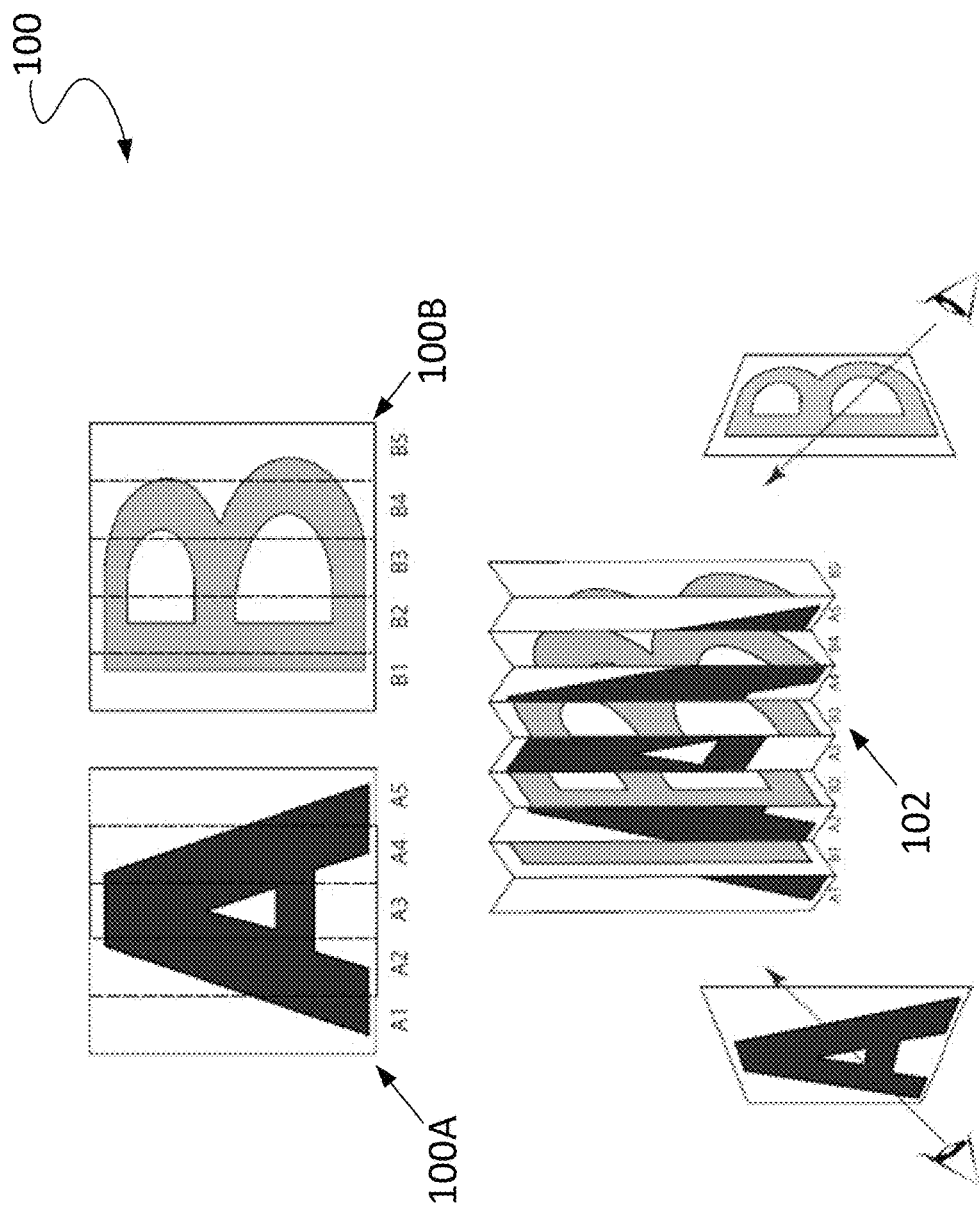
FIG. 1 illustrates an example of a variation of kinetic art from the 1950s.

The disclosed technology imbues the displayed imagery with an illusion of motion. Systems and methods of the present disclosure can achieve this visual effect applying, for example, a reverse perspective transformation to photos and installing those warped images onto a multi-faceted 3D surface that juts out toward the viewer. A spectacular illusion of vivid motion appears as the viewer moves from side to side in front of the framed imagery. Spectators now become active participants in an engaging visual dance that matches their movements with novel viewpoints into the scene.

In more detail, the disclosed technology achieves the illusion of motion by presenting the viewer with contradictory sensory cues. On a flat artwork, vanishing points are embedded deep into the scene, well in front of the viewer, where distant objects appear smaller. In implementations of the present disclosure, however, the surface upon which the artwork is drawn is not flat, which enables a transformation of the 3D geometry and rendered artwork such that the vanishing points are moved behind the viewer. In other words, the implementations incorporate surfaces that protrude towards the viewer such that the nearby surface areas are made to appear as if the surface areas are further from the viewer, in direct contradiction to the established norms of linear perspective. This technique, known as reverse perspective, tricks the brain to form an alternate understanding of the scene, thereby providing the viewer with the illusion of motion.

Various implementations elevate the disclosed technology into the domain of kinetic art, which depends on motion for its effect. Although motors or machinery can drive kinetic art, the apparent motion of the displayed photographs according to some implementations of the present disclosure is attributed to the movement of the viewer around the stationary imagery affixed to the 3D surface of the frame. The surface, made of tilted planar facets, is draped in imagery that conforms to reverse perspective geometry, which is at the basis of this visual illusion. Historically, the graphics that spans the surface of reverse perspective art has been limited to hand-painted or printed artwork that presented no opportunity for the consumer to alter.

The implementations can introduce a customizable variant to this fascinating artform by applying background imagery that blends seamlessly with user-supplied photographs. Such hybrid is possible by utilizing background themes such as photo galleries, museums, and billboards, that include regions in which user photos can be adapted to offer a satisfying level of customization. Some implementations provide a picture frame that introduces an opportunity to leverage photos as the centerpiece of a mesmerizing visual illusion in an artform that has resisted customization in the past.

Implementations can be supplemented with software to perform a reverse perspective transformation upon the selected photos. The goal is to make the photos conform to the 3D surface geometry of, for example, a frame panel of a picture frame, using vanishing points that lie behind the viewer to trigger the illusion of motion. Implementations are the first of its kind to offer a highly customizable reverse perspective effect by integrating photographs in, for example, a photo gallery theme and using this result to reimagine the picture frame.

By way of background illustration, picture frames have retained their function as protective and decorative edging for many centuries. Although styles have changed, the role of the frame remains as a transition between the painting and the surroundings while at the same time enhancing the artwork. The goal of the disclosed technology is to reimagine the picture frame as a platform in which to enhance photos by imbuing the photos with an illusion of motion. The presence of motion in art can be traced to the root of the kinetic art movement in the 1920s and in a different context where artists advanced the use of mobiles-sculptural works set to motion by motor, wind, or other forces. The goal was to transcend static art with the added dimension of time to introduce fluid transformations.

FIG. 1 is a diagram 100 illustrating a variation of kinetic art introduced in the 1950's by the Israeli artist, Yaacov Agam, who popularized a form known as the Agamograph. The Agamograph is a lenticular artform in which paintings or pictures are applied on materials that have been shaped in a pleated manner and displayed in 3D so as to afford the viewer different images depending upon the viewing direction in relation to the art. As illustrated, the Agamograph is made by slicing two images, namely image 100A and 100B, into vertical strips (e.g., A1 to A5, and B1 to B5) that are then interleaved upon the folds of a pleated sheet 102, which can be a paper. In this illustration, image 100A appears fully intact when the observer's viewing direction faces the A pleats (e.g., A1 to A5). In that line of sight (right bottom corner), the alternating B strips point away from the viewer, making image 100B hidden from view. As the viewer moves laterally and the viewing direction changes to face the B pleats (left bottom corner), image 100B becomes fully visible while image 100A recedes from view. This result is particularly effective when two images are presented to a moving viewer, as in roadside billboards.

Visual realism in art was greatly advanced by the advent of linear perspective, which is a system of creating an illusion of depth of 3D scenes on a flat 2D surface. Devised by the Italian Renaissance architect Filippo Bruneleschi (1377-1446) in around 1415, linear perspective uses three essential components: orthogonals (e.g., parallel lines that recede in the distance), the horizon line, and a vanishing point along the horizon line. The linear perspective facilitates the well-known observation that distant objects appear foreshortened and that parallel lines and planes converge to infinitely distant vanishing points as they recede in space from the viewer. The codification of Bruneleschi's linear perspective discovery was first published by Leon Alberti in his treatise Della Pittura (On Painting) in 1435. Although evidence of some form of perspective is known to exist in the ancient Greek and Roman periods, the formalization and precision of the approach was lost until the 15th century.

Figures 2A, 2B, 2C:
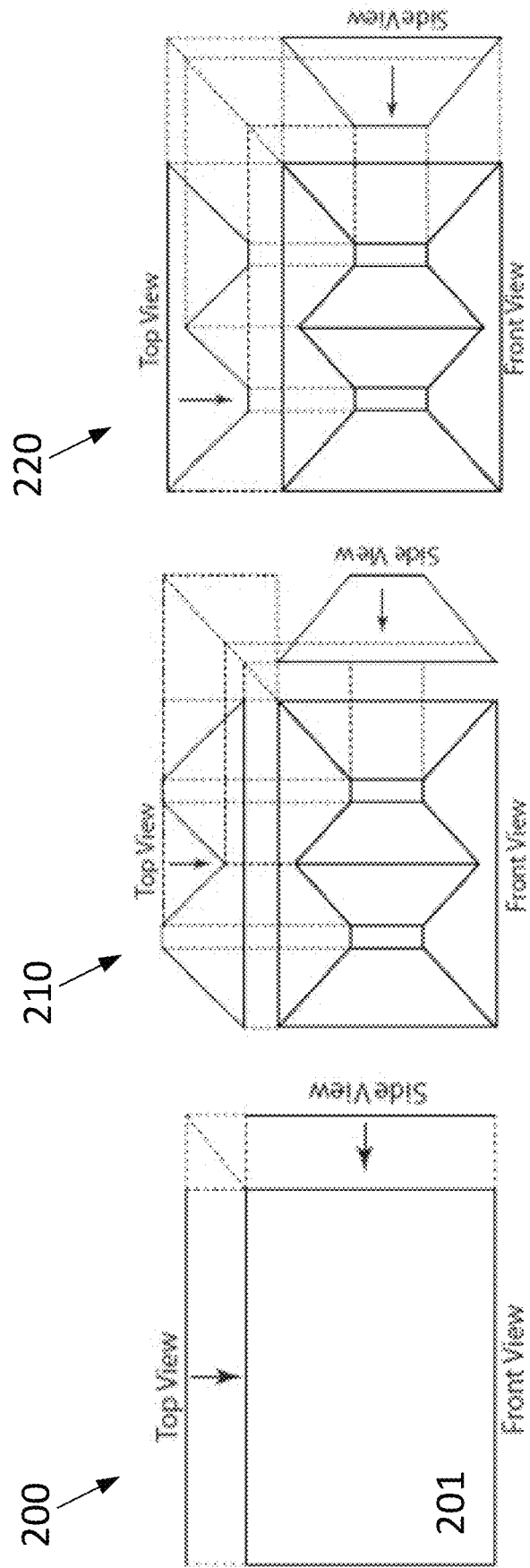
FIGS. 2A to 2C each illustrates the top view, the front view, and the side view of various surfaces according to some implementations of the present disclosure.

The most prevalent use of linear perspective is on a flat surface. This usage is also known as flat perspective. The impression of vivid depth is created from depth cues such as perspective foreshortening and convergence of parallel lines towards one or more vanishing points. This is the approach devised by Bruneleschi and found in widespread use among virtually all paintings. Referring to FIG. 2A, diagram 200 depicts the front, top, and side views of a flat surface 201. Notably, the top and side views of the flat surface 201 are seen as straight edges, indicating no depth to the drawing surface. Since the rich depth cues embedded in a linear perspective painting are incongruent with the flat surface, a viewer who moves in front of the painting generally would not perceive that the scene moves.

Another use of linear perspective is for theatre staging Referring to FIG. 2B, diagram 210 shows the front, top, and side views of using linear perspective for theater staging. As illustrated, this approach, which is also known as forced perspective, paints directly on a 3D surface whose depth is congruent with the painting in the front, top, and side views. That is, the depths suggested by the painting are consistent with the depths of the 3D surface so that near/distant points on the painting lie on near/distant points on the drawing surface. A scene drawn in this manner generally does not appear to move for a moving viewer.

In comparison, implementations aim at reimagining the picture frame as a platform to enhance the photos by imbuing the photos with an illusion of motion. Some implementations can place the photos, customized by the user, into a scene that appears to move in response to the viewer's position in front of the picture frame. Such effect can establish an interactive viewing experience that facilitates deeper engagement as the viewer explores the scene across varying distances and angles. Moreover, the implementations operate by letting the art itself remain static while having the viewer move to imbue the art with a stunning and vivid illusion of motion. The motion is apparent only as long as the observer's viewpoint moves.

Further referring to diagram 220 of FIG. 2C, the implementations of the present disclosure operate by leveraging reverse perspective, or reverspective. A side-by-side comparison with FIG. 2B reveals that the distant points in the painting of diagram 220 that used to lie on distant points on the surface of diagram 210 now lie on nearby surface points instead. In particular, near/distant points on the painting are drawn on distant/near points on the drawing surface. This counterintuitive approach to drawing presents the viewer with inconsistent depth cues that triggers the visual illusion that the object moves in response to viewer movement.

The reverse perspective had been discovered before. For example, British artist Patrick Hughes once introduced the use of a 3D surface of a room for his paintings but reversed the depths suggested by the painting, making the depth cues inconsistent with the depths of the 3D surface. Notably, in his childhood during World War II, when hiding in the cupboard under the stairs of his home during the German bombing campaigns over England in 1940-1941, Hughes spent many hours looking up at the uncovered stairs from underneath, the wrong way around. Apparently, this experience was to serve as an inspiration two decades later when Hughes made a sculpture of railway lines in perspective converging to a single vanishing point and inspected the piece from the wrong end. Intrigued by his observation, Hughes crafted his first reverspective art, known as the Sticking-out Room, in 1964. This painting piece was a room whose geometry was turned inside-out and painted by imagining the vanishing points to lie at the position of the viewer instead of distant locations.

Some European medieval art, for example those introduced in Byzantine paintings over a thousand years ago, had also used inverse perspective, which was a symbol of Eastern Orthodox spirituality. In contrast with the realistic drawing techniques introduced in the Renaissance period that followed, Byzantine paintings have the distant objects appearing larger and on a generally flat surface. It has been suggested that this style was adopted due to the religious nature of Byzantine artwork and that the holy protagonists should be depicted larger in size than the less important ones that often appear in the near field.

Figure 3C:
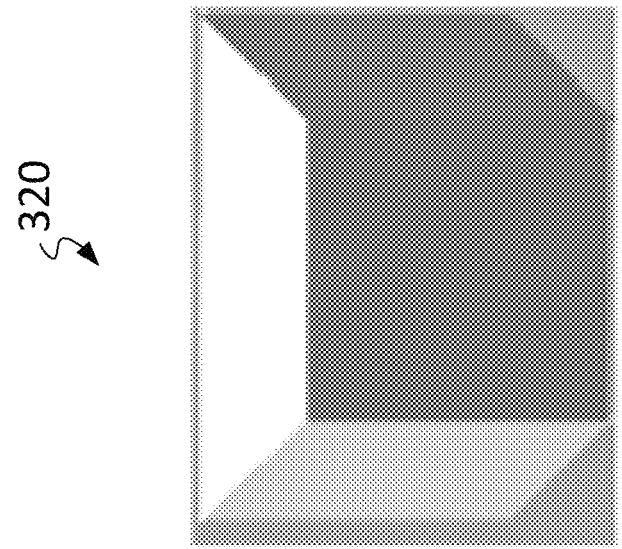
FIGS. 3A to 3C illustrate an example of fusing multiple viewpoints.
Figure 3B:
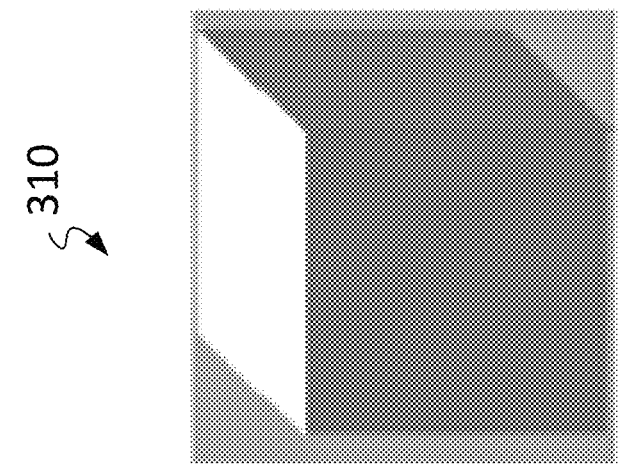
Figure 3A:
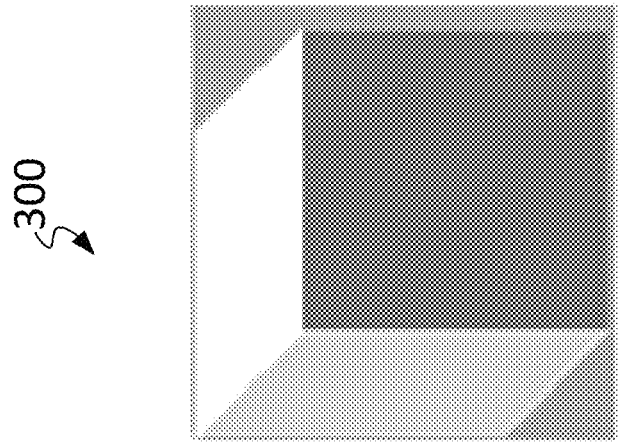

By the early 20th century, Pablo Picasso, who initiated the Cubist artistic movement, began to consistently question the unique viewpoint doctrine of Western art and brought forward the possibility of the simultaneous rendering of the subject from a number of different viewpoints of 3D space or the even more advanced notion of viewing the subject from a unique point in 4D space, an unimaginable position that permits simultaneous views upon 3D objects from multiple viewpoints. This idea often produces images that are reminiscent of the reverse perspective of Christian icons in Byzantine art. An example of fusing multiple viewpoints is shown in FIGS. 3A, 3B, and 3C, whereby the view of a small cube as seen by the left and right eyes are shown in diagram 300 (FIG. 3A) and diagram 310 (FIG. 3B), respectively, while the fusion of these disparate images can be depicted in diagram 320 (FIG. 3C).

Figure 4:
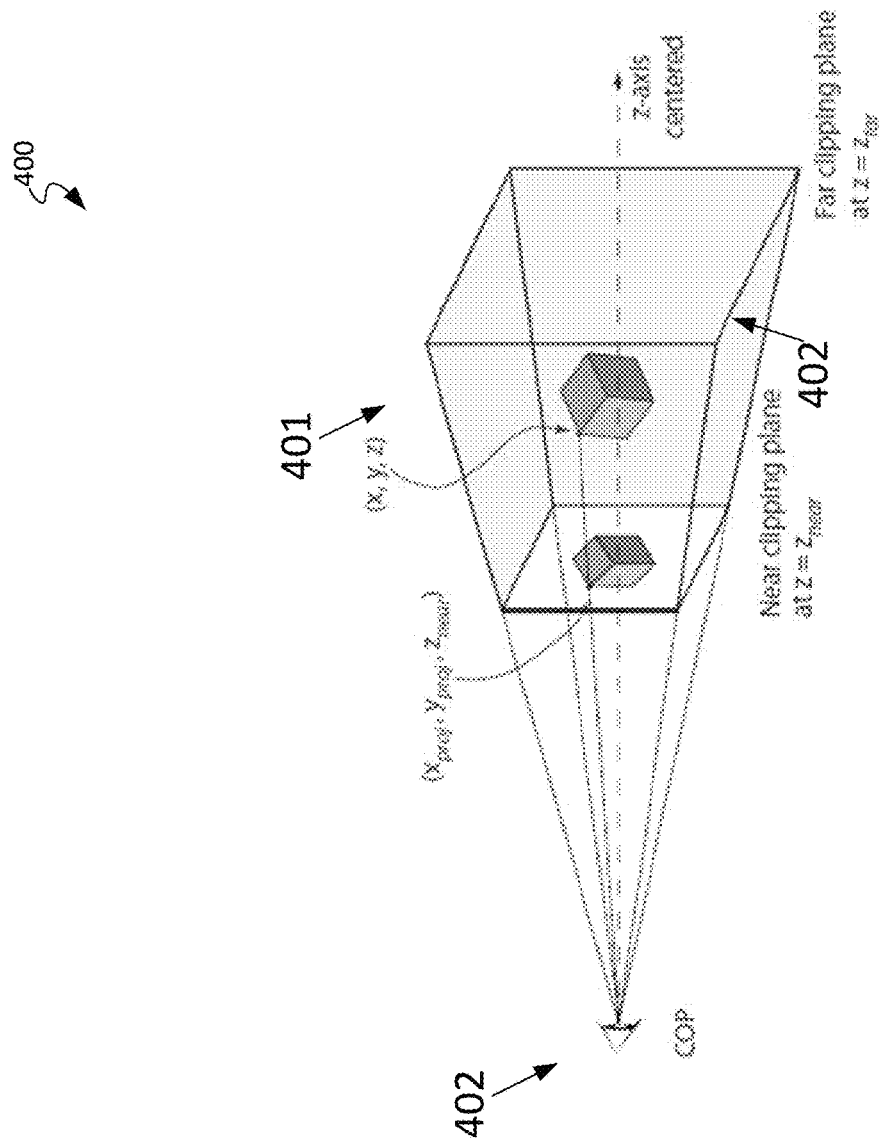
FIG. 4 illustrates an example of a synthetic camera model, as incorporated by some implementations of the present disclosure.

Computer graphics offers a precise mathematical formulation for perspective transformations that is exploited in the exposition. Here, a synthetic camera model can be introduced to explain the projection of points in a 3D scene onto a view plane to form the 3D perspective image of the scene. As shown in FIG. 4, the camera model 400 generally includes a view volume 401 that specifies the region in space that is to be projected and drawn. The perspective view volume is often described as a frustum, which is a truncated pyramid whose apex coincides with the camera position 402. This point is known as the center of projection, or COP, since visible rays converge to the camera at that point. The frustum, depicted in the shaded region 402 of FIG. 4, is that portion of the pyramid that lies between the near and far clipping planes at $z=z_{near}$ and $z=z_{far}$, respectively. Only 3D points delimited within the frustum will be projected towards the COP. The intersection of these rays onto the view plane forms the perspective image. Although the view plane may lie anywhere, without loss of generality, FIG. 4 illustrates the viewing plane as coinciding with the near clipping plane where $z=z_{near}$. Several industry standards, such as OpenGL used for high performance computer graphics, adopt the illustrative convention of FIG. 4.

Figure 5:
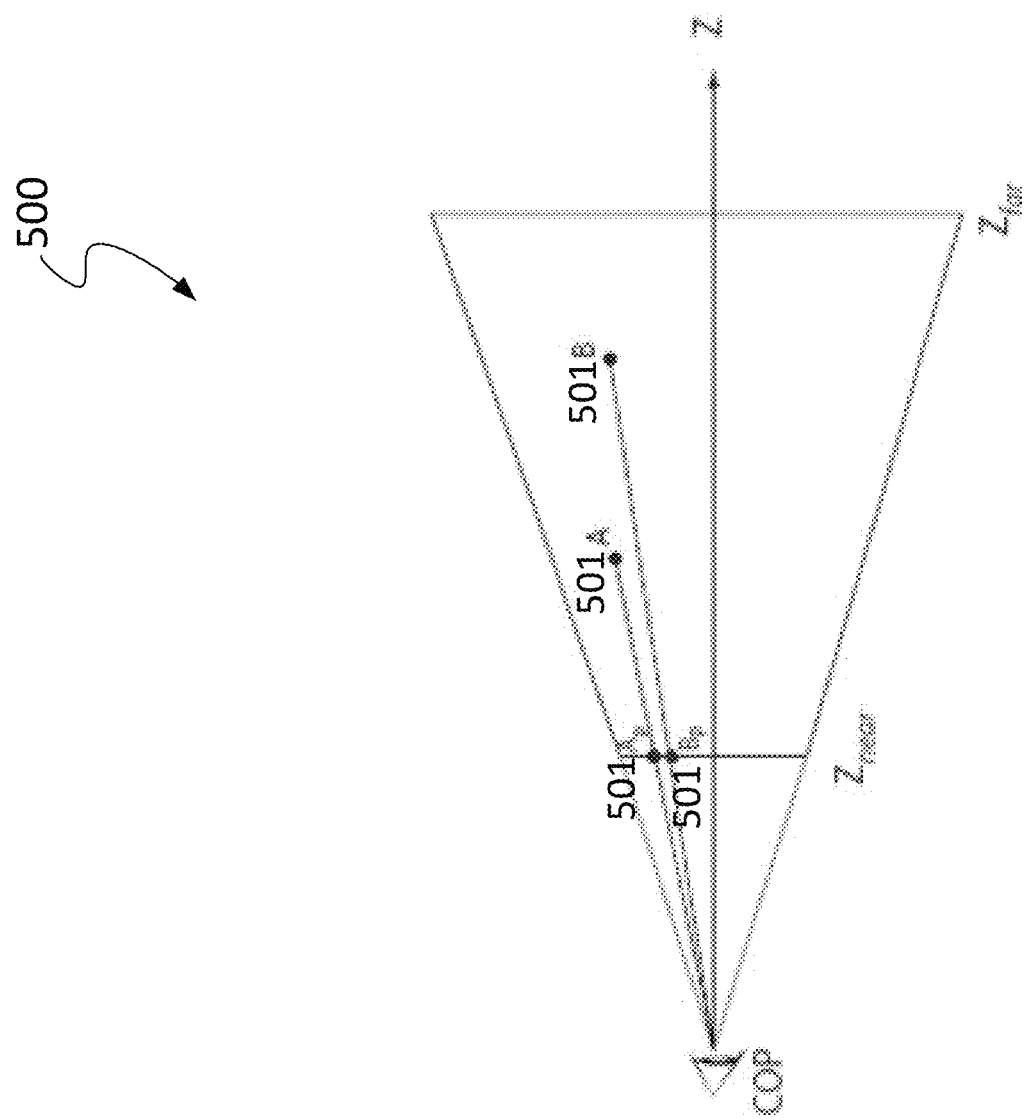
FIG. 5 illustrates examples of projection used by the synthetic camera model of FIG. 4.

Using this illustrative convention, distant points will appear foreshortened as these points are projected to the view plane. This effect is illustrated in diagram 500 of FIG. 5, which depicts two points, 501A and 501B, that share the same height at different distances from the view plane. These two points project along rays that converge to the (OP and intersect the view plane at 501A$_p$, and 501B$_p$, respectively. As illustrated, the apparent position of 501A$_p$ is above that of 501B$_p$, which is consistent with foreshortening of distant points in perspective images. Note that 3D points lying on the view plane will remain unchanged by the projection to the viewing plane $z=z_{near}$.

The notion of the frustum may be used to limit the set of 3D points to be rendered. In general, clipping against a particular shape may not be trivial. As illustrated by a comparison of diagram 600 of FIG. 6A and diagram 610 of FIG. 6B, the graphics pipeline introduces a projection transform to convert the viewing frustum 602 into a cube 612. This projection can accommodate a canonical view volume for clipping (from object 601 to object 611). Because the far end of the frustum 602 is larger than the near end, objects further from the camera undergo more contraction than nearby objects upon mapping the frustum into the cube 612. Once 3D points (e.g., object 601) are transformed to lie in a canonical view volume (e.g., object 611), the COP is moved to a point at infinity, as shown in diagram 610 of FIG. 6B. This projection has the effect of eliminating the intersection at which the visible rays converge, thereby making these rays parallel. Perspective projection is thus supplanted by orthographic projection, whereby the x and y coordinates remain the same, while the z coordinate (depth) can be dropped to form the 2D points on the view plane.

Figure 7:
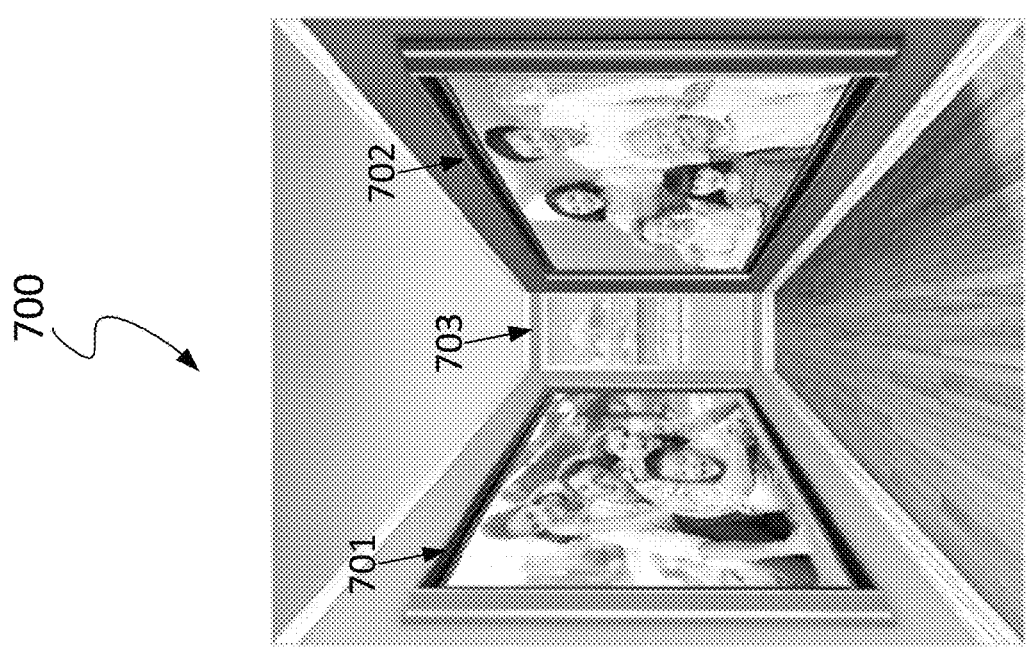
FIG. 7 illustrates an example of a gallery scene according to some implementations of the present disclosure.
Figure 8:
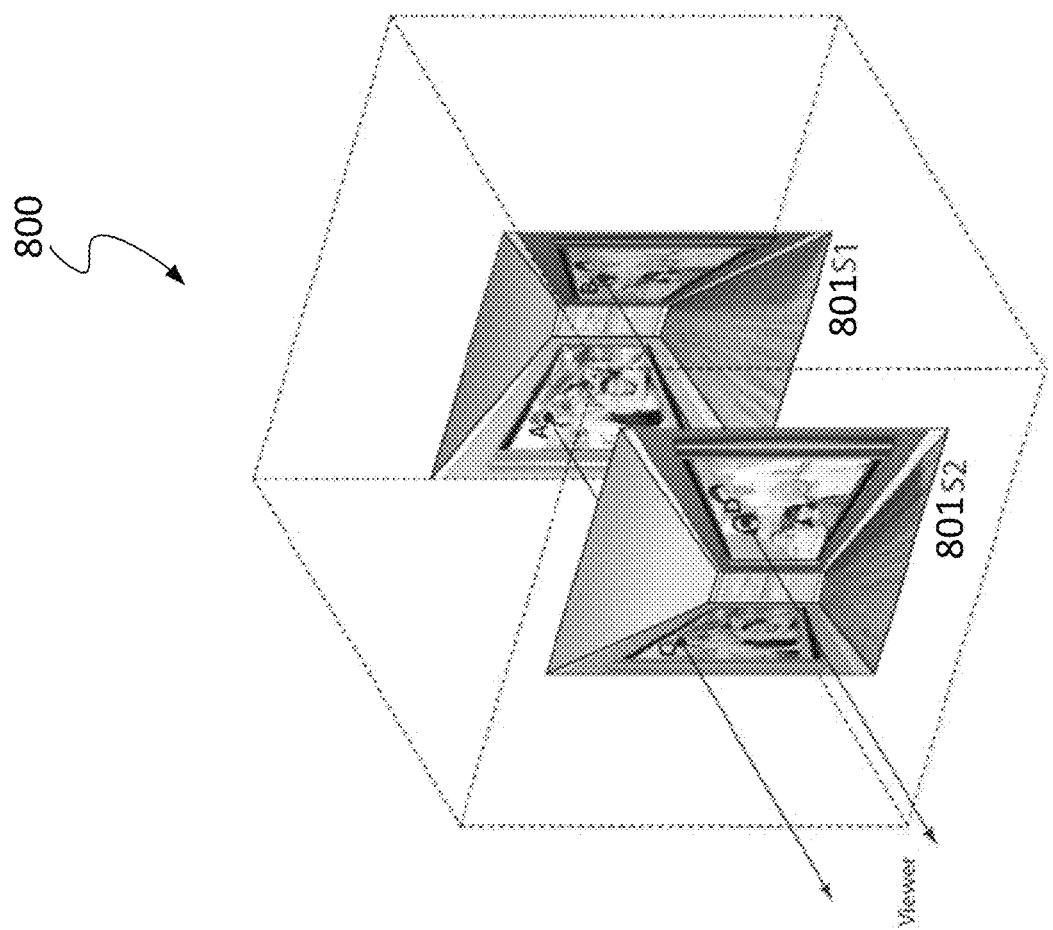
FIG. 8 illustrates examples of two surfaces for the gallery scene of FIG. 7.
Figure 9:
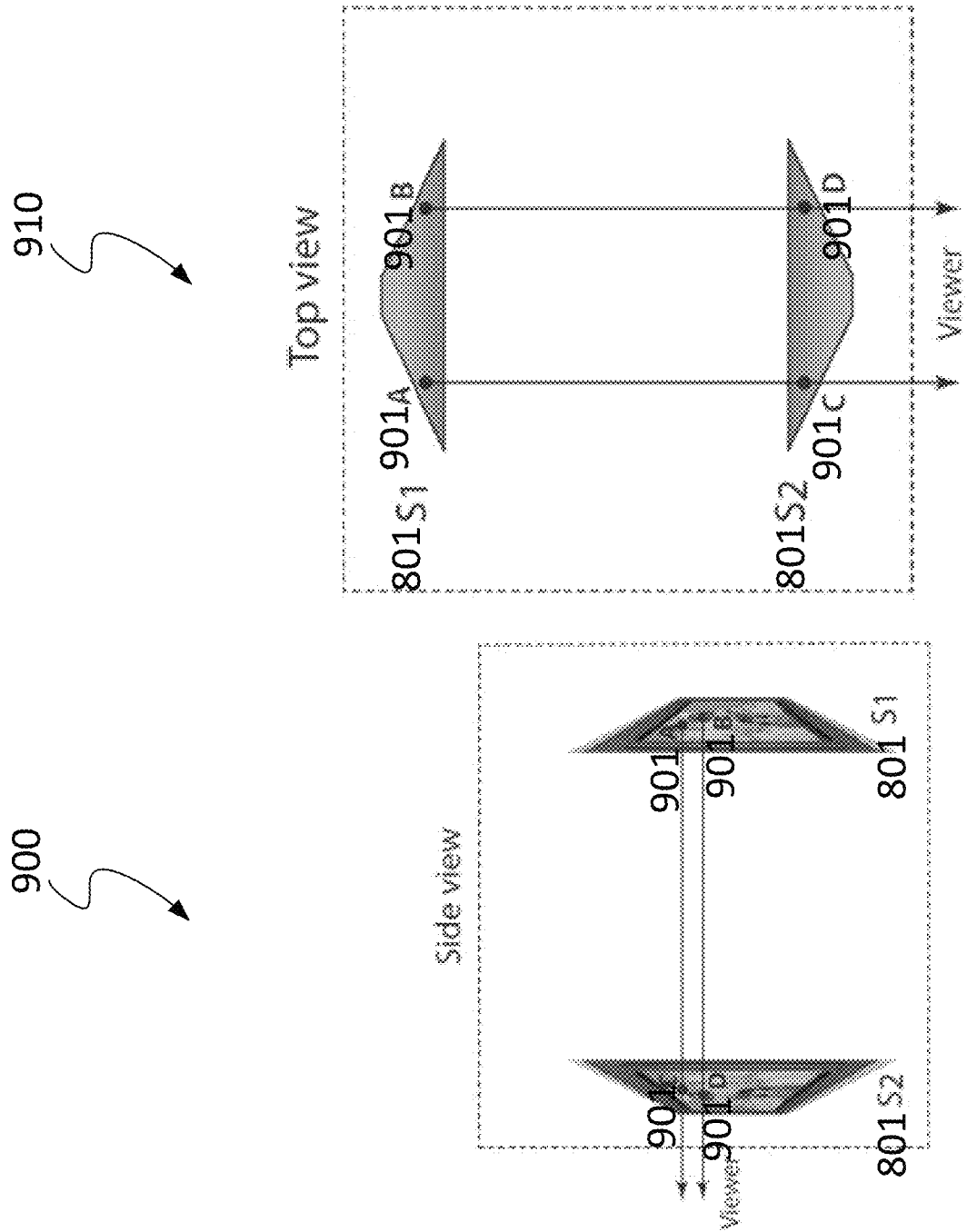
FIGS. 9A and 9B respectively illustrate the side view and the top view of a projection experienced by the two surfaces of FIG. 8.

Notably, projection transformations reveal a property to be exploited in a reverse perspective. Since the (x, y) coordinates of a 3D point in a cube remain unchanged after orthographic projection, the depth z of that point no longer matters. The implication of this property is illustrated in FIG. 7, which shows an image of a 3D scene 700 depicting two framed photos, namely 701A and 701B, hanging on the walls of a hallway with a rear window 703. By embedding this scene into a viewing frustum and applying a perspective projection, implementations can generate the view plane image shown in FIG. 7 as well as the geometry depicted in one half of FIG. 2B. Surface 801S$_1$, as depicted in diagram 800 of FIG. 8, represents an oblique view of this geometry in a canonical view volume. Notably, the rich depth cues suggested by the image are congruent with surface 801S$_1$. The side view 900 and top view 910, respectively shown in FIGS. 9A and 9B, confirm the foreshortening that applies to distant scene points. The parallel set of rays that are orthographically projected from 801S$_1$ may pierce any set of surfaces as the rays travel to the view plane at the front of the cube to form the image of the 3D scene 700 of FIG. 7. One such surface includes the reverse geometry depicted in 802S$_2$, in which the depth cues suggested by the image are inconsistent with the depths of the 3D surface. As such, an image painted on surfaces 801S$_1$ and 802S$_2$ appears identical after orthographic projection. Notably, points 901A and 901B on 801S$_1$ are projected to intersect surface 801S$_2$ at 901C and 901D, respectively. In general, the viewer sees the same projected image as long as the viewer remains directly in front of the surface embedded in the canonical view volume (e.g., cube). The impact of the surface geometry becomes apparent when producing new renderings of the painted scene from new and distinct viewing directions.

Figure 10:
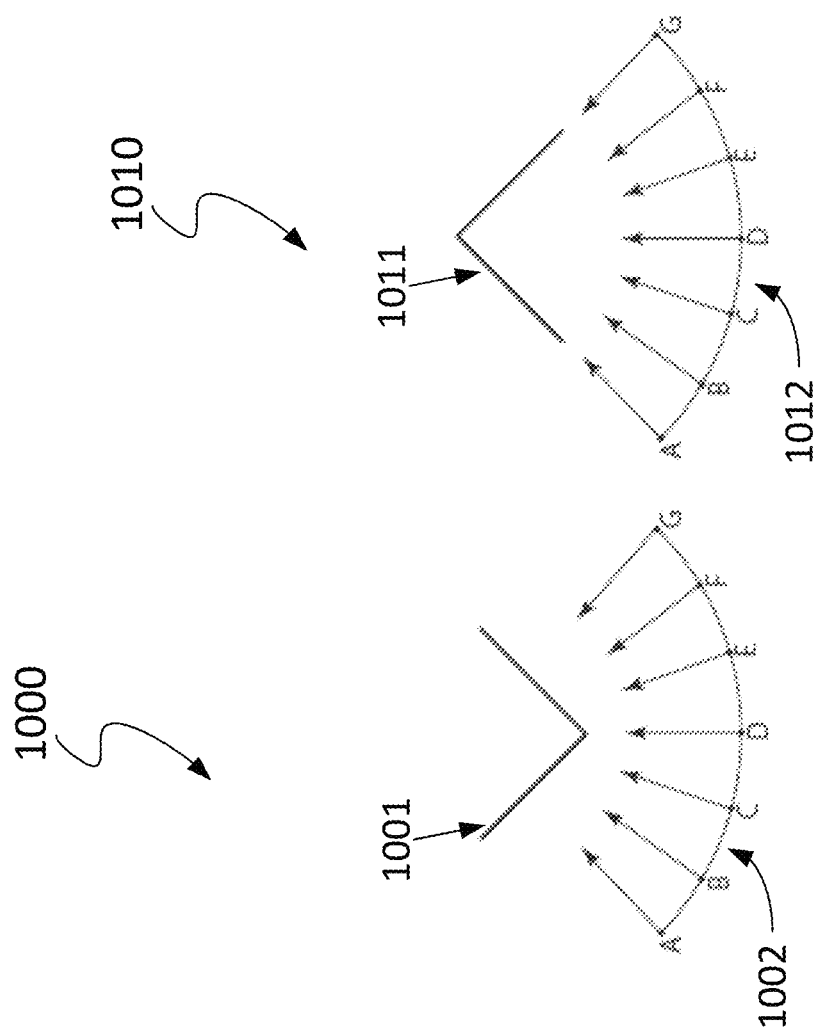
FIGS. 10A and 10B each illustrates the viewing angles for viewing two surfaces of a cube according to some implementations of the present disclosure.
Figure 11:
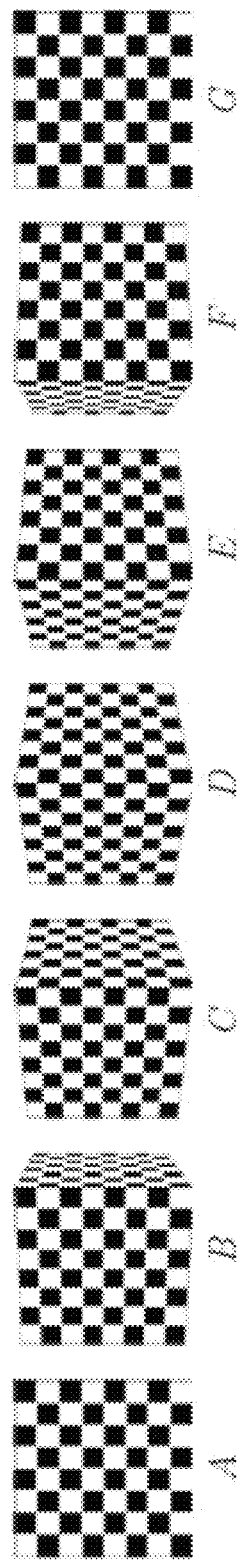
FIG. 11 illustrates an example of a viewing progression for FIG. 10A.

Diagrams 1000 (FIG. 10A) and 1010 (FIG. 10B), respectively, show the frontal faces of cubes 1001 and 1011 overlaid with a checkerboard pattern. Comparing and contrasting diagrams 1000 and 1010, the illusion derived from using reverse perspective, as leveraged by some implementations, can be explained below. When a viewer inspects the checkerboard cube along a circular path 1002, as shown in FIG. 10A, the views seen along the path 1002, between positions A through G, are depicted in FIG. 11. This represents the natural expectation of seeing all of the left face while at position A, and increasingly seeing more of the right face as the viewer moves along path 1002 towards the center when both faces are seen in equal amounts at position D. Thereafter, the right face starts to dominate the view as the viewer moves towards position G. A viewer would thus fully expect that the central edge in D is closest to the viewer due to the visual cues of the vanishing lines. The results shown in FIG. 11 include the foreshortening effects of perspective, as noted by the vanishing lines, as well as the collapse of faces due to the view direction approaching the grazing angle. This example is thus consistent with a stationary viewer watching a cube spin in the clockwise direction about a vertical axis.

Figure 12:
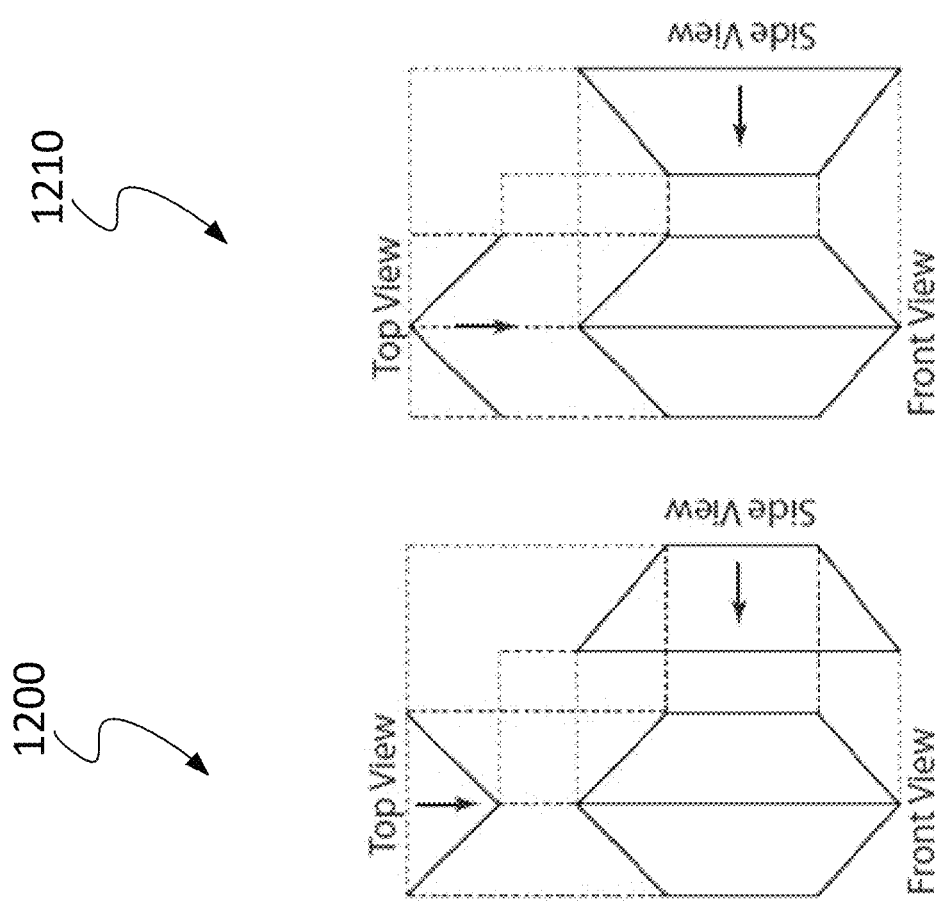
FIGS. 12A and 12B illustrate examples of perspective transformations, as leveraged by some implementations of the present disclosure.
Figure 13:
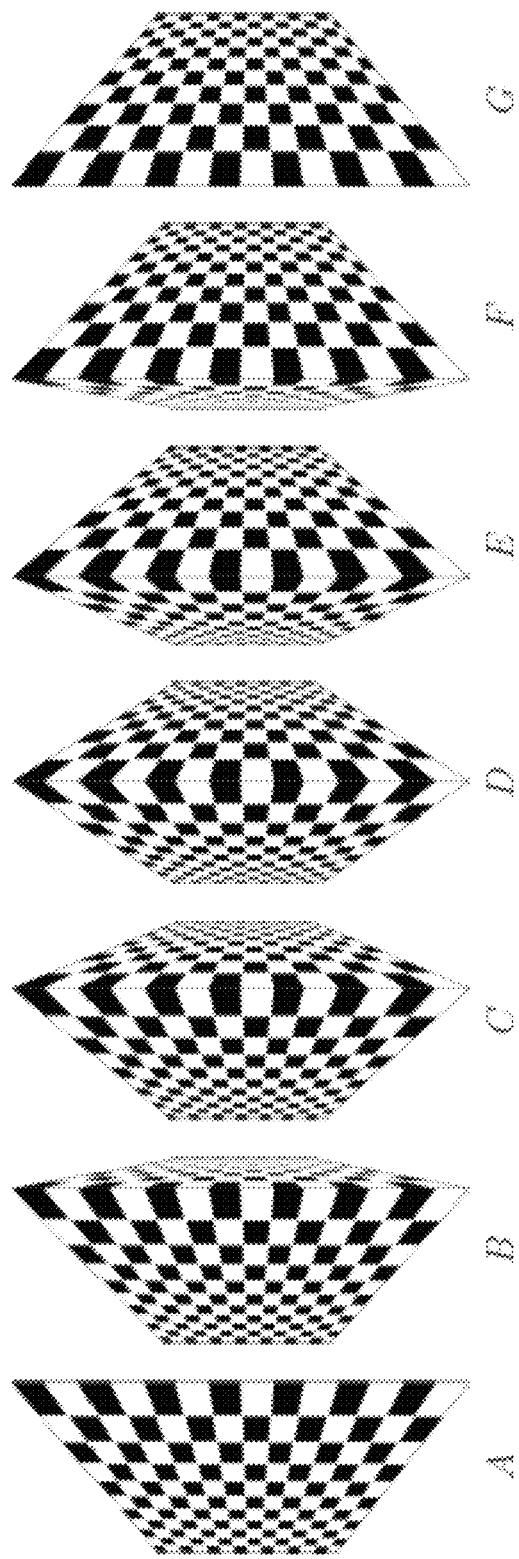
FIG. 13 illustrates examples of results of applying a perspective transformation to the example of FIG. 10A.

Further referring to FIGS. 12A and 12B, the shape of the two faces as seen at the frontal position D can be explained in perspective transformations. Here, the square faces have each become trapezoids by the perspective transformation. While the true geometry remains square faces of a cube, the perspective projection of the cube leads to a shape that is frozen as the viewer walk around the cube. That is, the viewer forms the geometry depicted in the two facets in the middle of diagram 220 of FIG. 2B, as depicted in diagram 1200 of FIG. 12A. If the viewer walks around this geometry, the viewer perceives the corresponding views for positions A-G, as shown in FIG. 13. While distorted, the progression at least conforms to the direction of rotation that was associated with the cube. In other words, the view is entirely consistent with a viewer watching these facets spin in the clockwise direction about a vertical axis. This perspective view is known as the forced perspective view.

Figure 14:
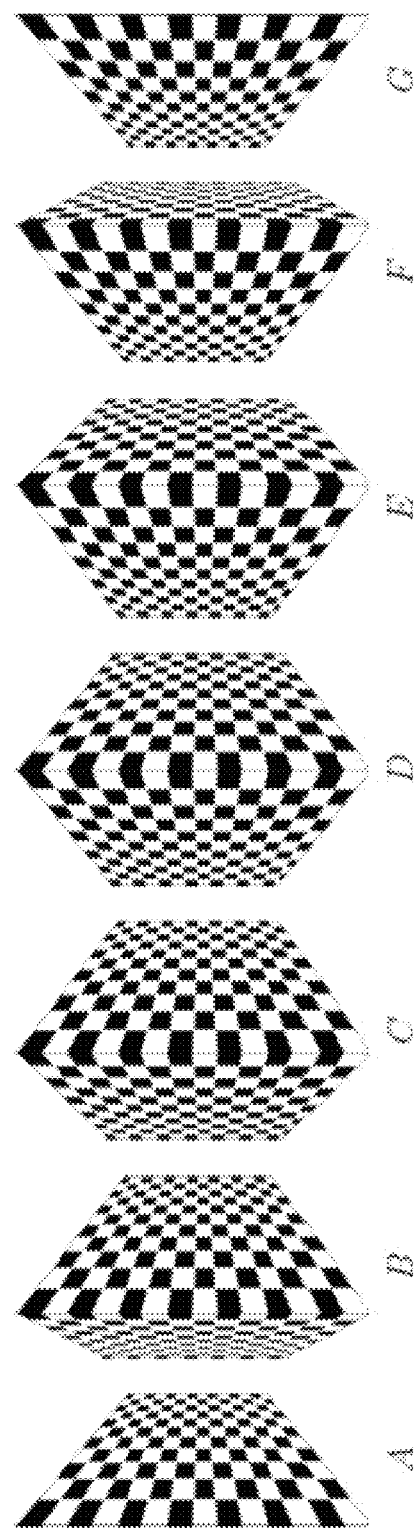
FIG. 14 illustrates examples of results of applying another perspective transformation to the example of FIG. 10B.

When the depths of these two faces are reversed, as depicted in diagram 1210 of FIG. 12B, then the view at position D on path 1012 (FIG. 10B) would remain the same due to the loss of depth information upon orthographic projection. However, the views along the path 1012 between A and G (FIG. 10B) for this configuration would be vastly different, as shown in the corresponding views of FIG. 14. Notably, the facets now appear to be spinning in precisely the opposite direction than in the forced perspective example in FIG. 13. In other words, this view progression is consistent with a viewer watching these facets spin in the counterclockwise direction about a vertical axis. The perspective view illustrated by FIGS. 10B and 14 is known as reverse perspective view. The slight scale changes between the forced and reverse perspective images in FIG. 13 and FIG. 14 are due to the effect of distance in the perspective transformations used to create these renderings.

Figure 15A:
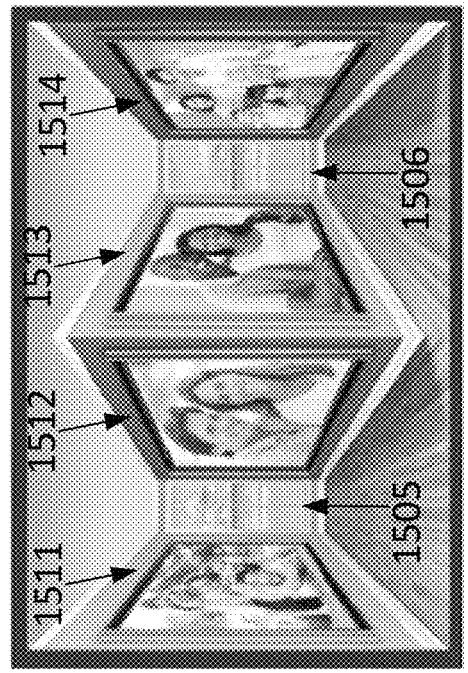
FIGS. 15A and 15B illustrate an example of an end-user decorating a gallery scene using customized photos according to some implementations of the present disclosure.
Figure 15B:
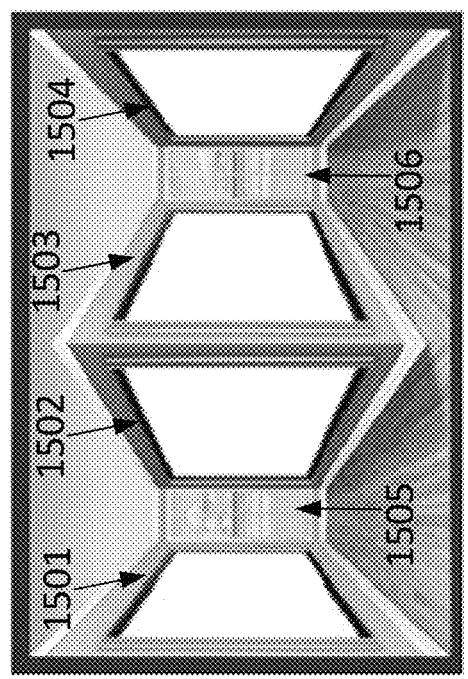
Figure 15C:
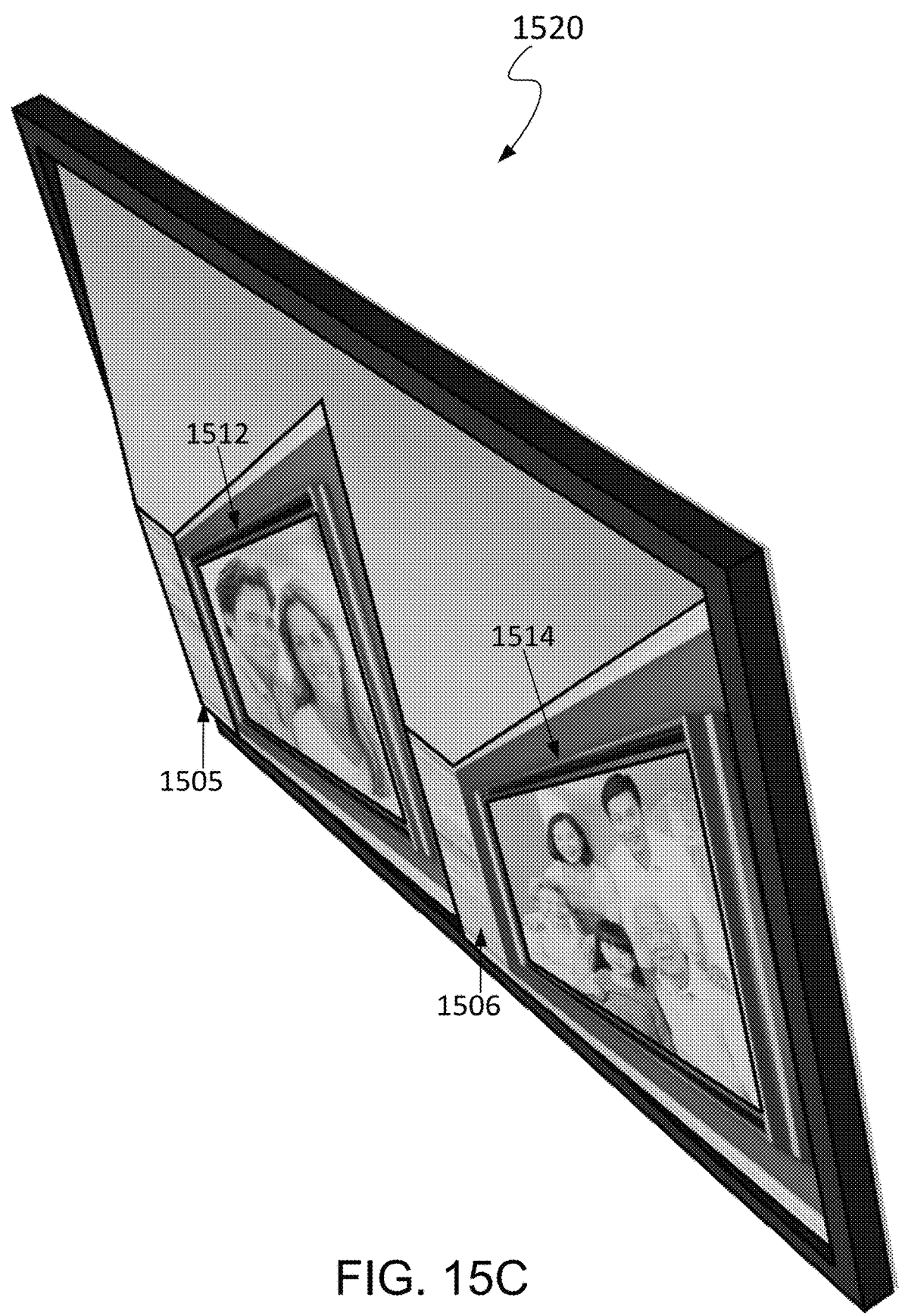
FIG. 15C shows an example of an oblique view of the picture frame based on the gallery scene of FIGS. 15A and 15B.

The implementations allow an artwork to engage the viewer in an interactive manner in which the viewer's movement can trigger the illusion of motion in the scene. Although serving as a partner to this motion, the viewer is not a partner to the artwork content. The implementations therefore permit the artwork itself to be customized by the viewer and be susceptible to the spellbinding illusion of motion, which is an improvement over existing static artwork (e.g., room sculpture by Patrick Hughes and Byzantine paintings that defy linear perspective to portray holy protagonists in larger-than-life sizes in the distance). For example, the implementations may allow a user to customize photos for presentation in a photo gallery scene. FIG. 15A shows an example of a photo gallery scene 1500 with four framed panels, namely 1501, 1502, 1503, and 1504. These framed panels 1501 to 1504 are suitable for incorporating user-specified photographs adapted in size and shape. Photo gallery scene 1500 further includes gallery floor and ceiling (shown as blue sky for ease of illustration). Photo gallery scene 1500 additionally includes intervening scenes 1505 and 1506 (shown as windows located between two neighboring framed panels). FIG. 15B shows an example of gallery scene 1510 in which adapted photos (e.g., adapted photos 1511, 1512, 1513, and 1514) from the user are each embedded in a corresponding framed panel (e.g., framed panels 1501 to 1504). FIG. 15C shows an example of an oblique view 1520 of the gallery scene 1510 where adapted photos 1512 and 1514 are revealed, along with intervening scenes 1505 and 1506. As illustrated by this implementation of a picture frame, the adapted photos are tailored to the specific user who has provided the original photos for an interactive presentation in the gallery scene that merges the features of reverse perspective with user-selected imagery. In addition to accommodating mechanically affixed photos, the framed panels may also be implemented as electronic display devices. For example, the framed panels may each incorporate a flat panel display such as an organic light-emitting diode (OLED) device. An electronic display device may include a projection-type display that incorporates, for example, digital light processing (DLP) or liquid crystal on silicon (LCoS) technologies.

In this example of picture frame, the choice of angles used in the geometry of the surface where adapted photos are mounted can impact the degree of perspective foreshortening in the gallery scene. For example, increasing the depth of the surface, with respect to a fixed width and height, will increase the degree of perspective foreshortening. The implementations can strike a trade-off between the desirable illusion of perspective and the amount of foreshortening along the edge of the photo that appears to lie further from the viewer. A large degree of scale change across the photo may become undesirable if a person or region of interest lies in the heavily compressed areas.

The implementations can intentionally introduce textures that incorporate clear vanishing lines to draw the viewer's attention away from the actual 3D surface. In general, the scene is designed to camouflage the 3D geometry such that the viewer's attention is diverted from the nonplanar surface. In some cases, the effect can be realized, in a more noticeable manner, if the viewer is at least three feet away so that the perspective image appears to be drawn on a flat surface, eliciting surprise when the viewer's movement triggers a dramatic illusion of motion in the scene.

The 3D surface of the picture frame in this example can be made from cardboard, plastic, foam, or other resilient materials. The implementations can use thermoformed plastic for considerations of cost, compliance, and ease of manufacturing. The high-resolution graphic overlay can be printed on cardstock and affixed to each planar surface of the thermoformed plastic. The graphics overlay may be partitioned into regions suitable for convenient integration with the surface. For example, the graphics shown in FIG. 7 can be partitioned into three regions, namely, the sky, the floor, and the walls (for the framed panels). In some cases, the larger and more challenging overlay of the walls can be glued first, followed by the smaller sky and floor overlays. The first overlay can be printed with a small amount of bleed area to, for example, avoid gaps that may arise when the additional overlays are superimposed.

In this example, the graphic overlay of the walls has trapezoids that coincide with the positions of the framed photos. These areas can be cut out of the overlay to expose the photos that will lie behind the clear thermoformed plastic. The picture frame is equipped with small metal dots each, for example, glued to the back of the thermoformed plastic at the corners of the trapezoidal areas. In this arrangement, the user can position and replace photos by affixing the photos, sized and shaped for the surface of the graphic overlay of walls, using magnets. Implementations may also use other mechanisms, such as suction-based mechanism or those using staples or tape.

While the photographs provided by a user are generally square or rectangle in shape, the photos generally undergo a transformation that warp each input photo into a trapezoidal shape to conform to the exposed regions in the graphic overlay. One example of such transformation is a perspective transformation. Assuming the (u, v) input coordinates in the square image are mapped to the output (x, y) coordinates. The general representation of a perspective transformation is:

$$\begin{bmatrix} x' \\ y' \\ w' \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} u \\ v \\ 1 \end{bmatrix} \quad (1)$$

where $x=x'/w'$ and $y=y'/w'$.

A perspective transformation, or projective mapping, is produced when $a_{31}$ or $a_{32}$ is nonzero. The forward mapping functions that relate the input (u, v) coordinates to the output (x,y) coordinates are therefore:

$$x = \frac{x'}{w'} = \frac{a_{11}u + a_{12}v + a_{13}}{a_{31}u + a_{32}v + a_{33}} \quad (2a)$$

$$y = \frac{y'}{w'} = \frac{a_{21}u + a_{22}v + a_{23}}{a_{31}u + a_{32}v + a_{33}} \quad (2b)$$

Without loss of generality, the transformation matrix can be normalized so that $a_{33}=1$. This leaves eight degrees of freedom for a projective mapping. The eight coefficients can be determined by establishing correspondence between four points in the input and output images. Let $(u_k, v_k)$ and $(x_k, y_k)$ for k=0, 1, 2, 3 be these four points in the input and output images, respectively. Assuming $a_{33}=1$, Eqn. (2a) and Eqn. (2b) can be rewritten as:

$$x = a_{11}u + a_{12}v + a_{13} - a_{31}ux - a_{32}vx \quad (3a)$$

$$y = a_{21}u + a_{22}v + a_{23} - a_{31}uy - a_{32}vy \quad (3b)$$

In the special case where the input is a square, the eight unknown coefficients of the transformation matrix can be solved directly by considering the mapping of a unit square onto an arbitrary quadrilateral. The following four-point correspondences are established from the uv-plane onto the xy-plane.

$$(0,0) \rightarrow (x_0, y_0)$$

$$(1,0) \rightarrow (x_1, y_1)$$

$$(1,1) \rightarrow (x_2, y_2)$$

$$(0,1) \rightarrow (x_3, y_3) \quad (4)$$

In this case, the eight equations become.

$$a_{13} = x_0$$

$$a_{11} + a_{13} - a_{31}x_1 = x_1$$

$$a_{11} + a_{12} + a_{13} - a_{31}x_2 - a_{32}x_2 = x_2$$

$$a_{12} + a_{13} - a_{32}x_3 = x_3$$

$$a_{23} = y_0$$

$$a_{21} + a_{23} - a_{31}y_1 = y_1$$

$$a_{21} + a_{22} + a_{23} - a_{31}y_2 - a_{32}y_2 = y_2$$

$$a_{22} + a_{23} - a_{32}y_3 = y_3$$

The following terms can be further defined:

$$\Delta x_1 = x_1 - x_2 \; \Delta x_2 = x_3 - x_2 \; \Delta x_3 = x_0 - x_1 + x_2 - x_3 \quad (5)$$

$$\Delta y_1 = y_1 - y_2 \; \Delta y_2 = y_3 - y_2 \; \Delta y_3 = y_0 - y_1 + y_2 - y_3$$

In a projective mapping, $\Delta x_3 \neq 0$ or $\Delta y_3 \neq 0$, and the coefficients of the perspective transformation are:

$$a_{31} = \begin{vmatrix} \Delta x_3 & \Delta x_2 \\ \Delta y_3 & \Delta y_2 \end{vmatrix} \Bigg/ \begin{vmatrix} \Delta x_1 & \Delta x_2 \\ \Delta y_1 & \Delta y_2 \end{vmatrix}$$

$$a_{31} = \begin{vmatrix} \Delta x_1 & \Delta x_3 \\ \Delta y_1 & \Delta y_3 \end{vmatrix} \Bigg/ \begin{vmatrix} \Delta x_1 & \Delta x_2 \\ \Delta y_1 & \Delta y_2 \end{vmatrix}$$

$$a_{11} = x_1 - x_0 + a_{31}x_1$$

$$a_{12} = x_3 - x_0 + a_{32}x_3$$

$$a_{13} = x_0$$

$$a_{21} = y_1 - y_0 + a_{31}y_1$$

$$a_{22} = y_3 - y_0 + a_{32}y_3$$

$$a_{23} = y_0$$

Figure 16:
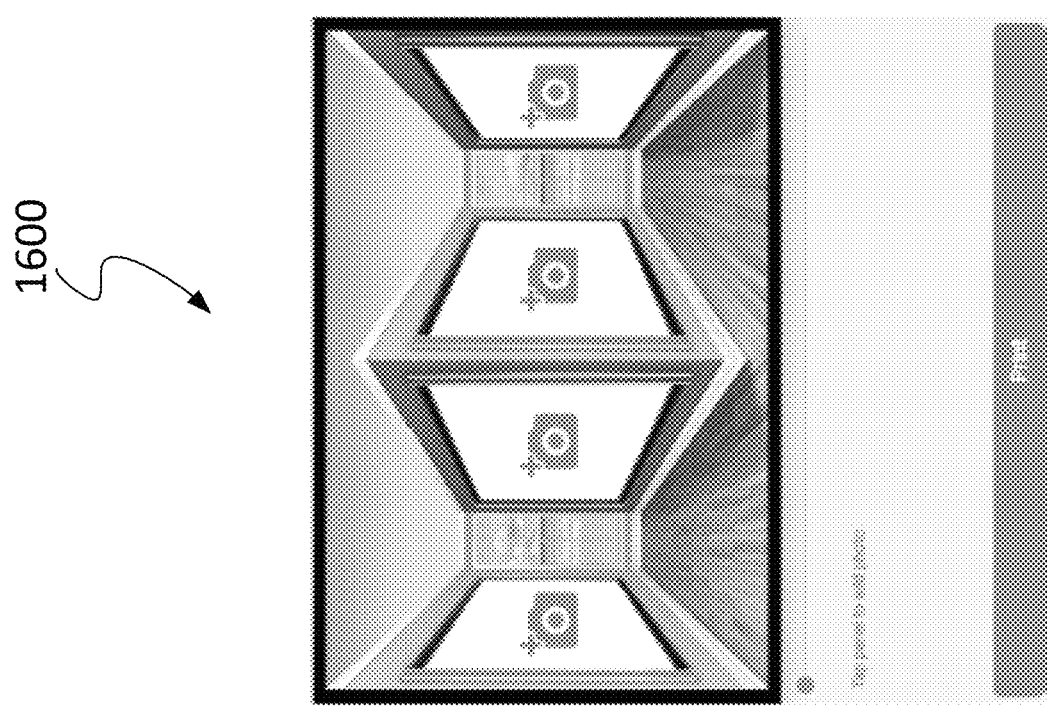
FIG. 16 shows an example of a screenshot according to some implementations of the present disclosure.

Some implementations may incorporate a mobile app so that the user can select photos from the user's collection and embed the photos (after adaptation) into the framed panels of the scene. FIG. 16 shows an example of landing page 1600 of an app depicting the framed panels into which the user may load up to four photos.

In the example illustrated by FIG. 16, when the user taps one of the four blank panels, a file selection tool is launched for the user to upload an image. For example, the user may have the option to scale and crop the image to make it fit a square panel, as illustrated in the screenshot 1700 of FIG. 17A. Although images are generally rectangular in shape, for ease of illustration, the example may assume the images as squares in order to achieve sufficient coverage on the gallery walls and to avoid the nonuniformity of portrait and landscape orientations in the collection.

After images have been uploaded and warped to fit the trapezoidal frames in the gallery scene, the user may further adjust the arrangement of the photos. For example, the user may replace the photos, or crop the photos. As already illustrated in screenshot 1700 of FIG. 17A, tapping any embedded image launches an editing tool allowing the user to perform operations such as replacement and cropping. In this illustration, the visualization of the product is grayed out and a list of editing choices are displayed. If the user opts to rearrange the photos, the app displays a set of thumbnail images (e.g., thumbnails 1711, 1712, 1713, and 1714), as shown in screenshot 1710 in FIG. 17B. The user may drag a thumbnail image from this set and drop the selected photo into the desired panel, thereby replacing the image that used to occupy that position.

Figure 18:
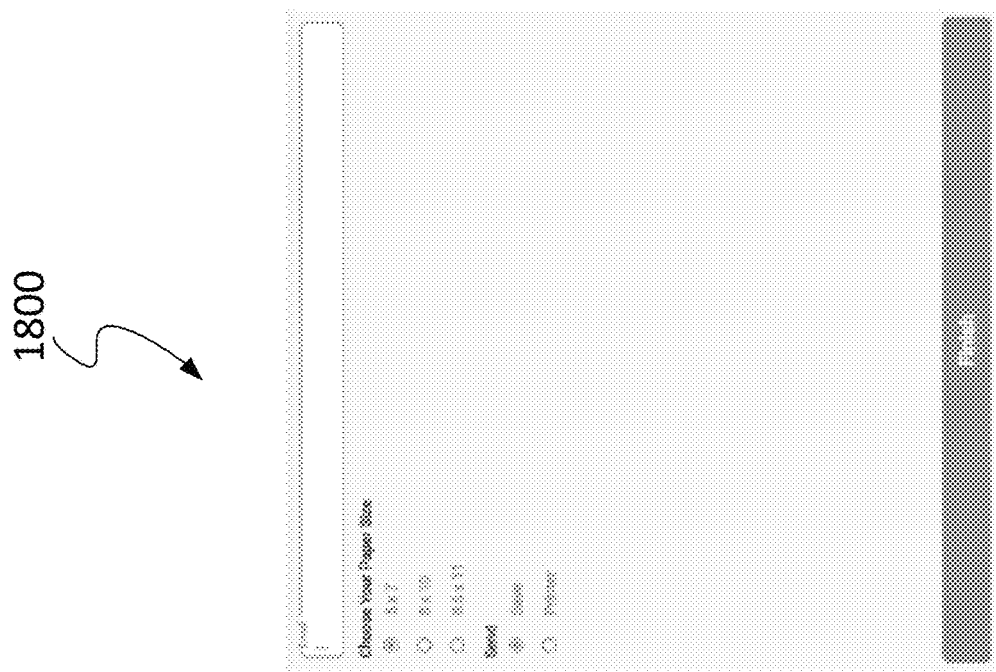
FIG. 18 shows an additional example of a screenshot according to some implementations of the present disclosure.

Once the image selection and editing stages are completed, the user can press the Print button at the bottom of the interface, shown in the loading page 1600 of FIG. 16. The user may then launch a page that prompts the user to select the page size for printing the four images, as shown in screenshot 1800 of FIG. 18. The images are warped into trapezoids using the method described above, and converted into, for example, files suitable for printing on the designated paper. Depending on the paper size, one or two images can be saved per page. Dotted cut lines may be drawn around the warped images to assist the user in cutting out the image before installing into the picture frame, as illustrated in FIG. 7. In some cases, premium photo paper may be preferred. Moreover, third-party printing services may be available for those users who do not have access to color printers or premium photo paper.

Figure 19A:
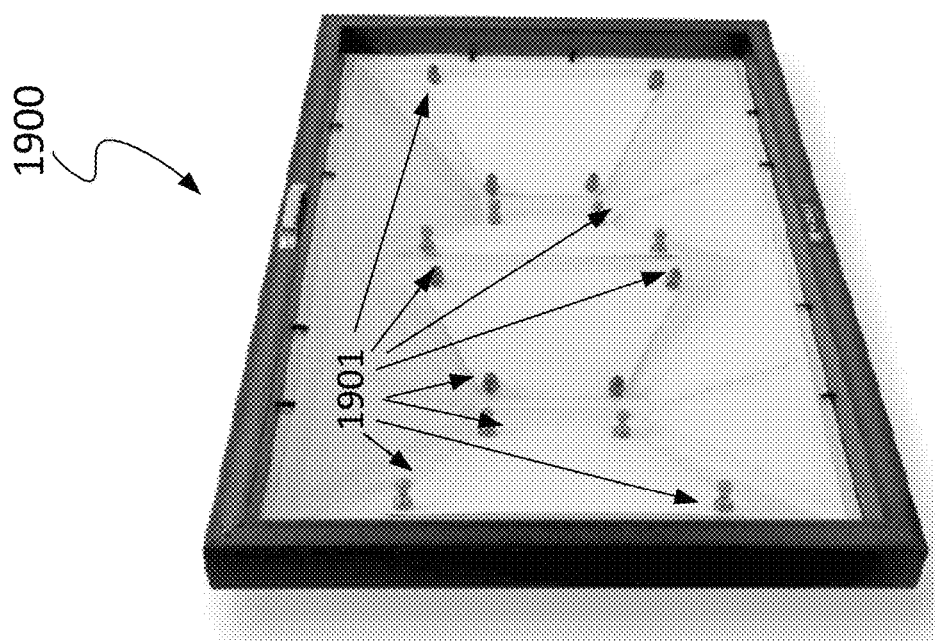
FIG. 19A illustrates an example of the back side of a picture frame according to some implementations of the present disclosure.
Figure 19B:
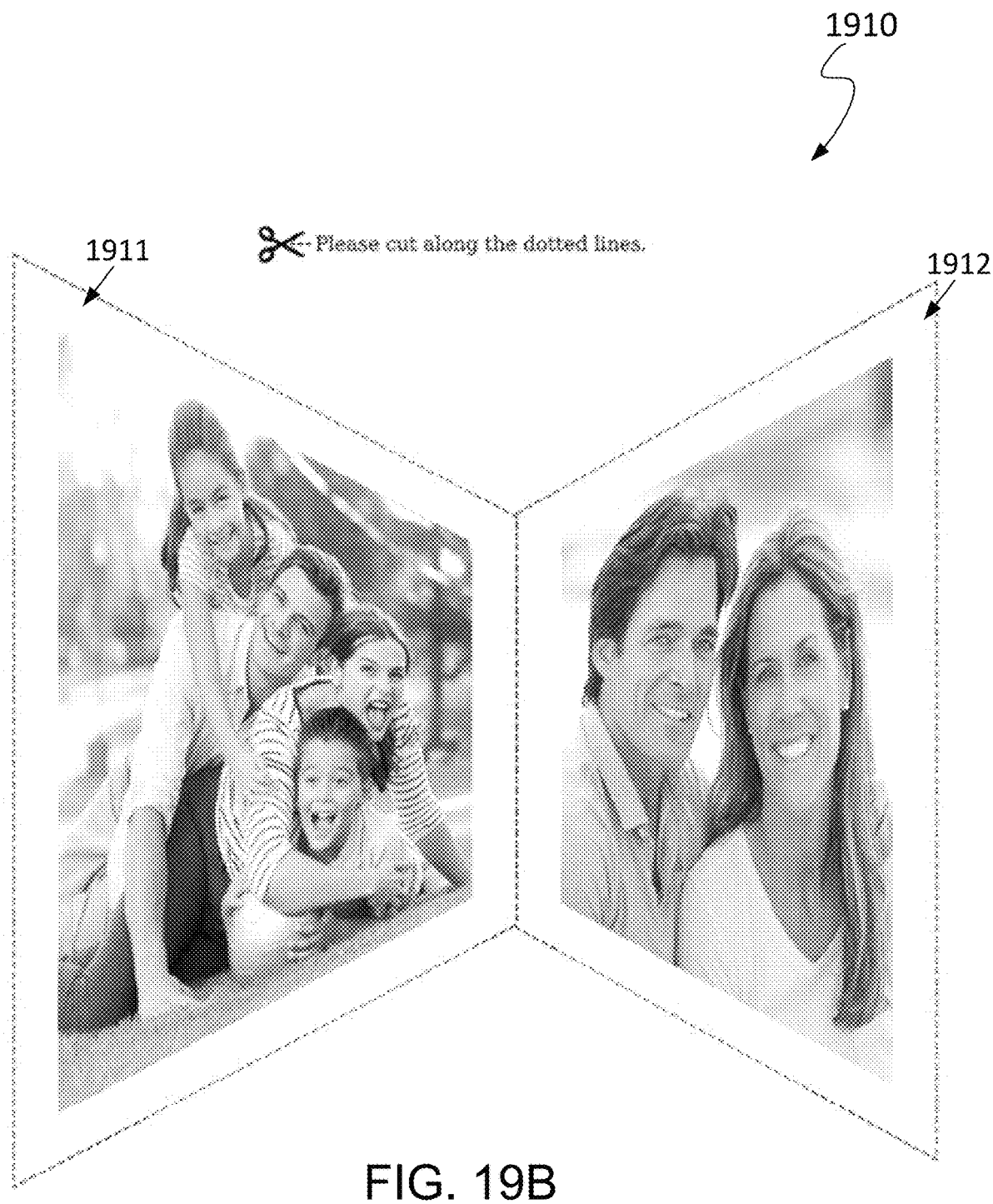
FIG. 19B illustrates an example of warped photos for the picture frame of FIG. 19A.

In some implementations, the trapezoidal images may be installed to the back of the picture frame by magnets, as shown in example 1900 of FIG. 19A. In this example 1900, photos are sandwiched between the magnets 1901 and the small metal dots already affixed to the trapezoid corners on the rear of the picture frame. In this example, the user can use a convenient method to quickly and easily install and modify the positioning of the photo paper into the trapezoidal openings in the picture frame. The user can also change photos as often as desired. FIG. 19B shows printout 1910 for installing on the back of the picture frame of FIG. 19A. As illustrated, printout 1910 includes warped photos 1911 and 1912, which, when cut along the dotted lines, can be installed on the back of the picture frame of FIG. 19A using, for example, magnets. In this example, warped photos 1911 and 1912 are trapezoidal in shape.

Figure 20A:
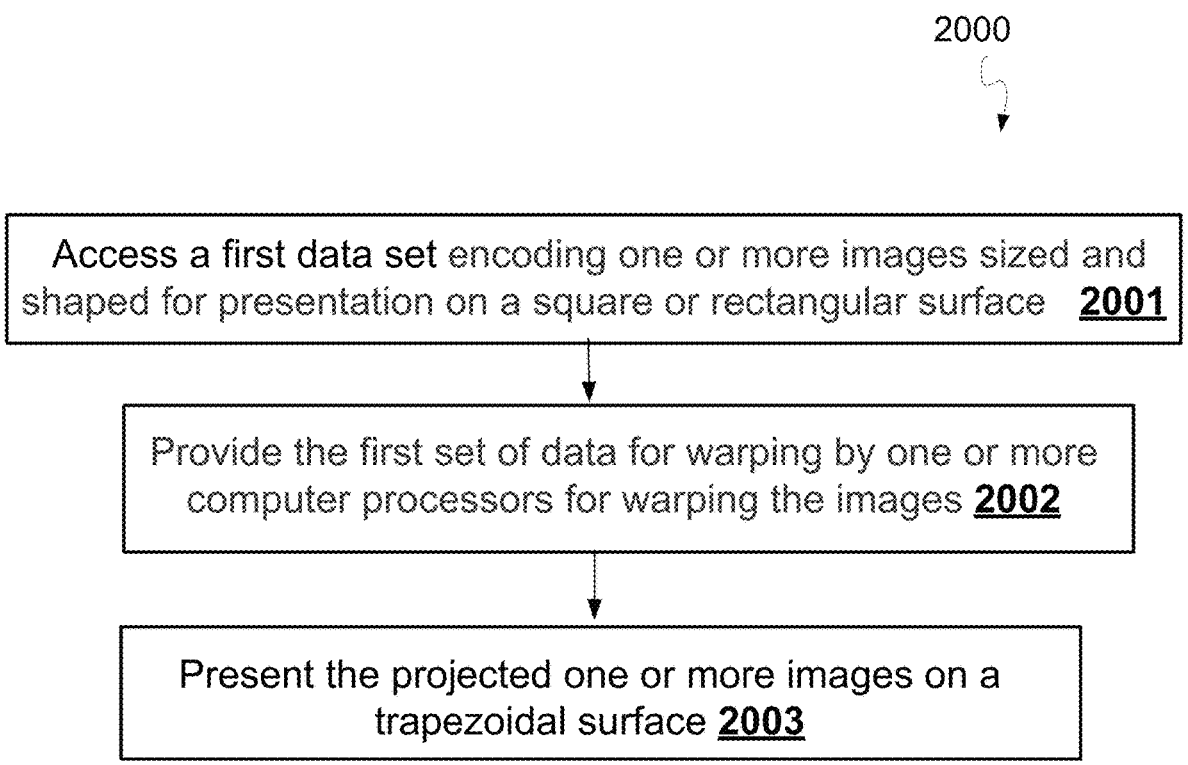
FIG. 20A is a flow chart of a process according to some implementations of the present disclosure.

FIG. 20A is a flowchart 2000 showing an example of a process according to some implementations. Initially, the process may access a first set of data encoding the one or more images sized and shaped for presentation on a square or rectangular surface (2001). For example, an end-user may select the one or more images (e.g., photos) for customized presentation in the gallery scene of, for example, FIGS. 15A and 15B. The end-user may select the photos and initially arrange the selected photos in a thumbnail view, as illustrated in, for example, FIG. 17B. The end-user may be presented with a preview of the gallery scene, as illustrated in, for example, FIG. 17B.

The process may then provide the first set of data for warping by one or more computer processors (2002). For example, the end-user may submit the first set of data to a website (or a cloud service), which performs the computations to project each of the one or more images onto a respective trapezoidal surface using, for example, the reverse perspective transformation illustrated in FIGS. 12B and 14. Each trapezoidal surface has a first base (e.g., the upper base) that is shorter than a second base (e.g., the lower base). As illustrated in, for example, FIG. 14B, the reverse perspective transformation projects a first portion (e.g., the near side) of each image further away from the viewer than a second portion (e.g., the far side) of each image. A server at the website can generate the second set of data encoding each of the projected one or more images for presentation on the respective trapezoidal surface. The end-user may receive, from the server at the website, the second set of data. In some cases, the perspective transformation can be performed by a mobile app installed on a mobile computing device of the end-user. In these cases, the mobile computing device of the end-user can generate the second set of data.

Figure 17:
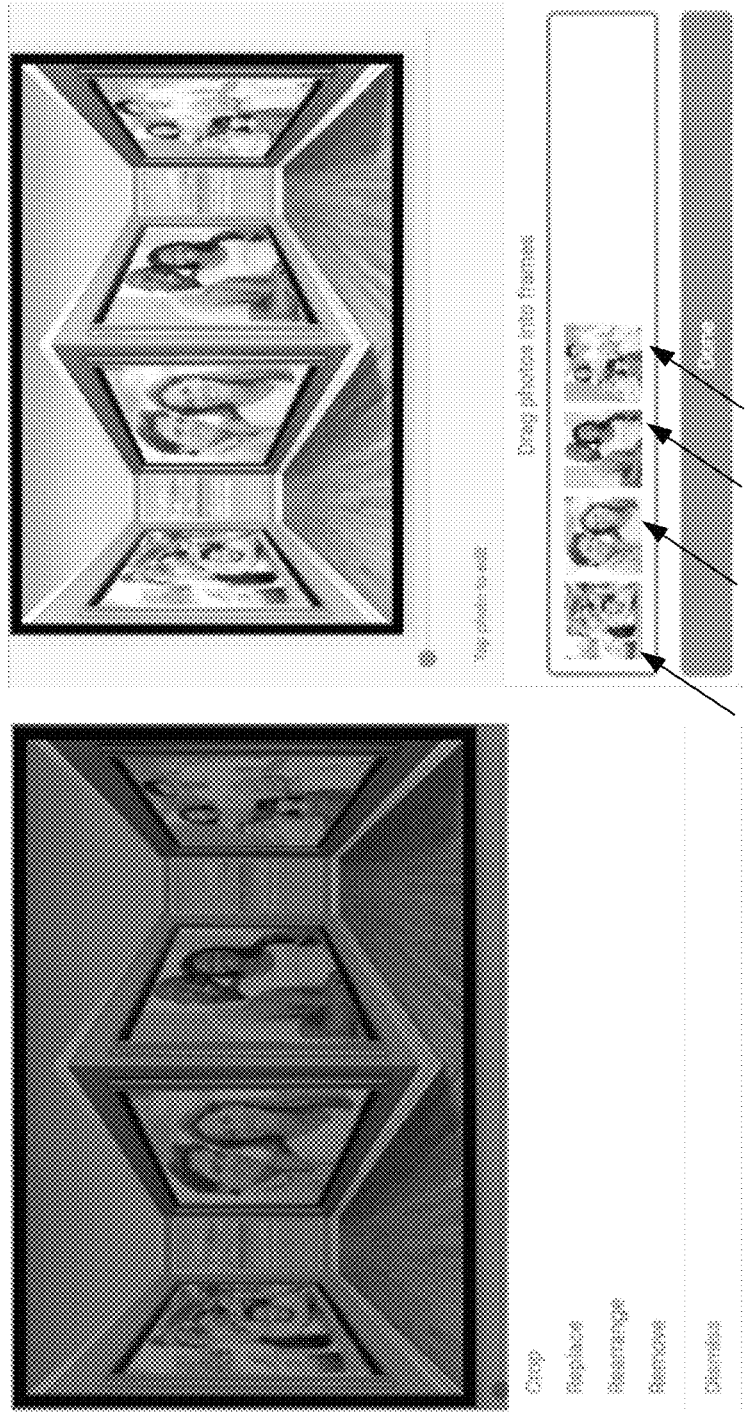
FIGS. 17A and 17B show examples of screenshots according to some implementations of the present disclosure.

The process may then present each of the projected one or more images on the respective trapezoidal surface (2003). For example, the end-user may have the transformed images printed as hard copies and then use magnets to mount the hard copies on the corresponding trapezoidal surfaces, as illustrated in FIGS. 17B and 19. The end-user can generate the printouts directly, or have a third party print the hard copies. In some implementations, the picture frame may incorporate an electronic display for displaying the transformed images. Examples of electronic display may include OLED devices, LCD devices, DLP devices, and LCoS devices. In the implementations, the first portion of each projected image is presented by the first base and the second portion of each projected image is presented by the second base even though the first portion of each projected image is further away than the second portion of each projected image. As discussed above, this placement causes an optical illusion. When the projected one or more images are viewed between the first viewing angle and the second viewing angle, the projected one or more images appear with the perceived motion even though each of the projected one or more images is static. This optical illusion gives the viewer an interactive experience when the viewer walks around the gallery scene of the picture frame.

Figure 20B:
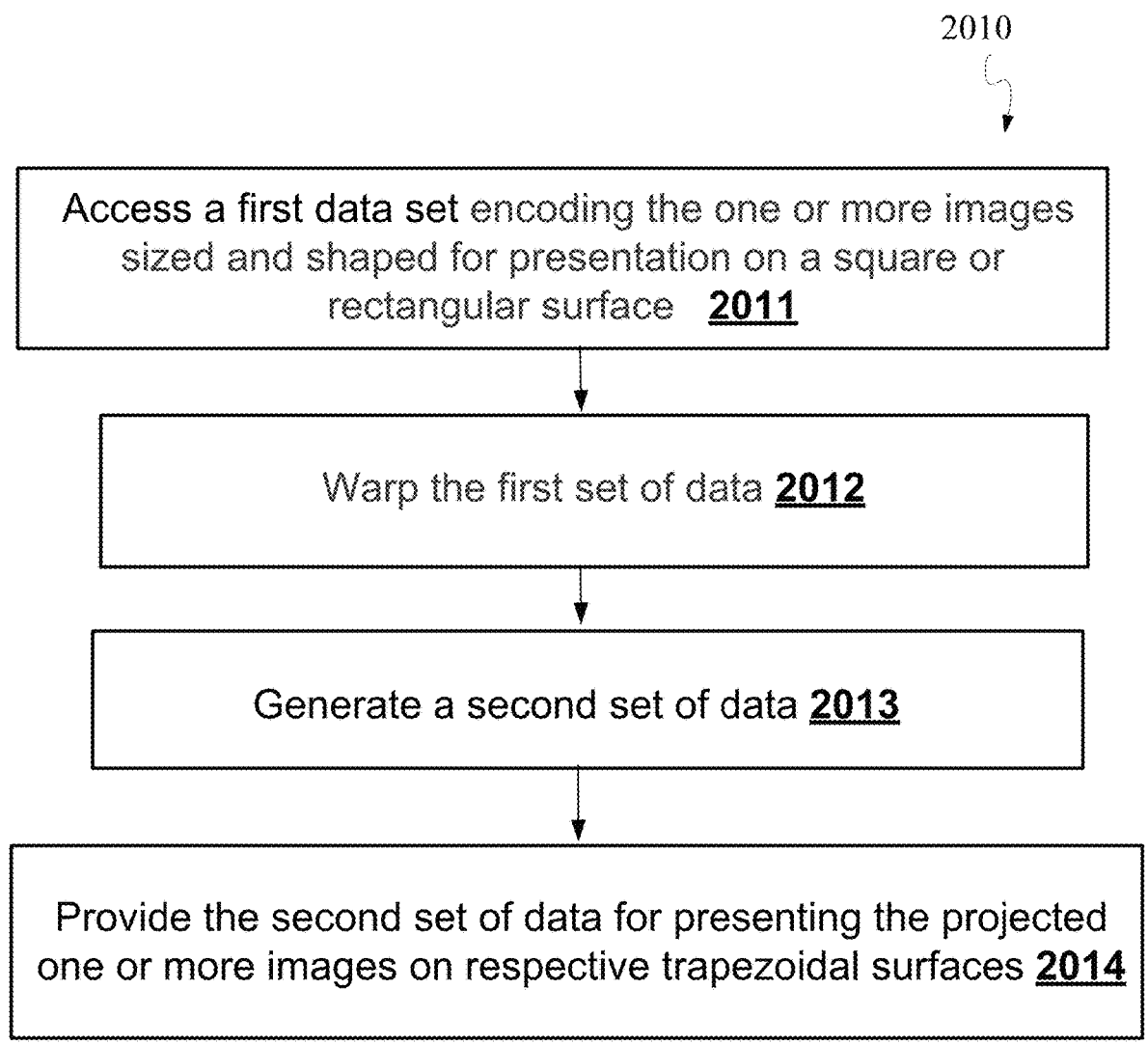
FIG. 20B is another flow chart for a process according to some implementations of the present disclosure.

FIG. 20B is a flowchart 2010 showing an example of a process according to some implementations. Initially, the process may access a first set of data encoding the one or more images sized and shaped for presentation on a square or rectangular surface (2011). For example, a centralized service (or a cloud service) may receive, from an end-user, the first set of data. In another example, a mobile app on the end-user's mobile device may receive the first data set. As discussed above, the end-user may select specific photos for customized display.

The method may then proceed to perform warping of the first set of data such that each of the one or more images is projected onto a respective trapezoidal surface (2012). As discussed above, each respective trapezoidal surface has a first base and a second base that is longer than the first base. In the implementations involving a server or a mobile app, one or more computer processors can perform the warping to generate a second set of data encoding each of the projected one or more images (2013). In some cases, the warping corresponds to the reverse perspective transformation, as discussed above in association with FIGS. 12A, 12B, and 13-14.

The process may then provide the second set of data for presenting each of the projected one or more images on the respective trapezoidal surface (2014). In implementations involving the server (or a cloud service), the second set of data may be transmitted to the end-user. In some cases, the end-user may generate hard copies and mount the hard copies on the corresponding trapezoidal surfaces, as illustrated in FIGS. 17B and 19. In some cases, the implementations may drive an electronic display for displaying the transformed images. Examples of electronic display may include OLED devices, LCD devices, DLP devices, and LCoS devices. As explained above, the first portion of each projected image is presented by the first base and the second portion of each projected image is presented by the second base even though the first portion of each projected image is further away than the second portion of each projected image. As discussed above, this placement causes an optical illusion. The optical illusion is created when the projected one or more images are viewed between the first viewing angle and the second viewing angle. During this progression, the projected one or more images appear with the perceived motion even though each of the projected one or more images is static, thereby providing the viewer with an interactive experience.

Figure 21:
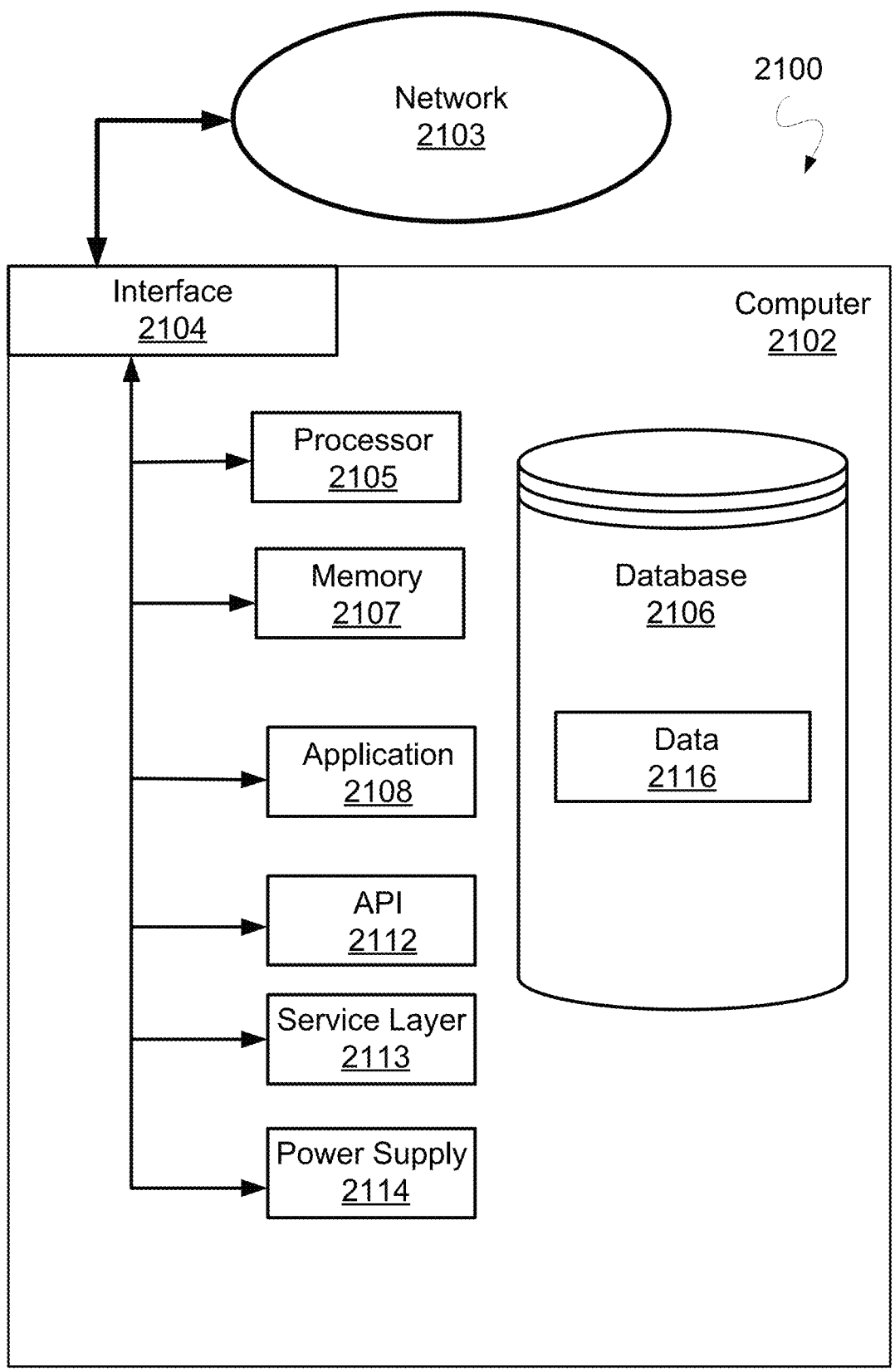
FIG. 21 is a block diagram illustrating an example of a computer system used to provide computational functionalities associated with described algorithms, methods, functions, processes, flows, and procedures, according to an implementation of the present disclosure.

FIG. 21 is a block diagram illustrating an example of a computer system 2100 used to provide computational functionalities associated with described algorithms, methods, functions, processes, flows, and procedures, according to an implementation of the present disclosure. The illustrated computer 2102 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 2102 can comprise a computer that includes an input device, such as a keypad, keyboard, touch screen, another input device, or a combination of input devices that can accept user information, and an output device that conveys information associated with the operation of the computer 2102, including digital data, visual, audio, another type of information, or a combination of types of information, on a graphical-type user interface (UI) (or GUI) or other UI.

The computer 2102 can serve in a role in a computer system as a client, network component, a server, a database or another persistency, another role, or a combination of roles for performing the subject matter described in the present disclosure. The illustrated computer 2102 is communicably coupled with a network 2103. In some implementations, one or more components of the computer 2102 can be configured to operate within an environment, including cloud-computing-based, local, global, another environment, or a combination of environments.

The computer 2102 is an electronic computing device operable to receive, transmit, process, store, or manage data and information associated with the described subject matter. According to some implementations, the computer 2102 can also include or be communicably coupled with a server, including an application server, e-mail server, web server, caching server, streaming data server, another server, or a combination of servers.

The computer 2102 can receive requests over network 2103 (for example, from a client software application executing on another computer 2102) and respond to the received requests by processing the received requests using a software application or a combination of software applications. In addition, requests can also be sent to the computer 2102 from internal users, external or third-parties, or other entities, individuals, systems, or computers.

Each of the components of the computer 2102 can communicate using a system bus 2103. In some implementations, any or all of the components of the computer 2102, including hardware, software, or a combination of hardware and software, can interface over the system bus 2103 using an application programming interface (API) 2112, a service layer 2113, or a combination of the API 2112 and service layer 2113. The API 2112 can include specifications for routines, data structures, and object classes. The API 2112 can be either computer-language independent or dependent and refer to a complete interface, a single function, or even a set of APIs. The service layer 2113 provides software services to the computer 2102 or other components (whether illustrated or not) that are communicably coupled to the computer 2102. The functionality of the computer 2102 can be accessible for all service consumers using this service layer. Software services, such as those provided by the service layer 2113, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 2102, alternative implementations can illustrate the API 2112 or the service layer 2113 as stand-alone components in relation to other components of the computer 2102 or other components (whether illustrated or not) that are communicably coupled to the computer 2102. Moreover, any or all parts of the API 2112 or the service layer 2113 can be implemented as a child or a sub-module of another software module, enterprise application, or hardware module without departing from the scope of the present disclosure.

The computer 2102 includes an interface 2104. Although illustrated as a single interface 2104 in FIG. 21, two or more interfaces 2104 can be used according to particular needs, desires, or particular implementations of the computer 2102. The interface 2104 is used by the computer 2102 for communicating with another computing system (whether illustrated or not) that is communicatively linked to the network 2103 in a distributed environment. Generally, the interface 2104 is operable to communicate with the network 2103 and comprises logic encoded in software, hardware, or a combination of software and hardware. More specifically, the interface 2104 can comprise software supporting one or more communication protocols associated with communications such that the network 2103 or interface's hardware is operable to communicate physical signals within and outside of the illustrated computer 2102.

The computer 2102 includes a processor 2105. Although illustrated as a single processor 2105 in FIG. 21, two or more processors can be used according to particular needs, desires, or particular implementations of the computer 2102. Generally, the processor 2105 executes instructions and manipulates data to perform the operations of the computer 2102 and any algorithms, methods, functions, processes, flows, and procedures as described in the present disclosure.

The computer 2102 also includes a database 2106 that can hold data for the computer 2102, another component communicatively linked to the network 2103 (whether illustrated or not), or a combination of the computer 2102 and another component. For example, database 2106 can be an in-memory, conventional, or another type of database storing data consistent with the present disclosure. In some implementations, database 2106 can be a combination of two or more different database types (for example, a hybrid in-memory and conventional database) according to particular needs, desires, or particular implementations of the computer 2102 and the described functionality. Although illustrated as a single database 2106 in FIG. 21, two or more databases of similar or differing types can be used according to particular needs, desires, or particular implementations of the computer 2102 and the described functionality. While database 2106 is illustrated as an integral component of the computer 2102, in alternative implementations, database 2106 can be external to the computer 2102. As illustrated, the database 2106 holds the previously described data 2116 including, for example, data encoding the images and warped images for display.

The computer 2102 also includes a memory 2107 that can hold data for the computer 2102, another component or components communicatively linked to the network 2103 (whether illustrated or not), or a combination of the computer 2102 and another component. Memory 2107 can store any data consistent with the present disclosure. In some implementations, memory 2107 can be a combination of two or more different types of memory (for example, a combination of semiconductor and magnetic storage) according to particular needs, desires, or particular implementations of the computer 2102 and the described functionality. Although illustrated as a single memory 2107 in FIG. 21, two or more memories 2107 or similar or differing types can be used according to particular needs, desires, or particular implementations of the computer 2102 and the described functionality. While memory 2107 is illustrated as an integral component of the computer 2102, in alternative implementations, memory 2107 can be external to the computer 2102.

The application 2108 is an algorithmic software engine providing functionality according to particular needs, desires, or particular implementations of the computer 2102, particularly with respect to functionality described in the present disclosure. For example, application 2108 can serve as one or more components, modules, or applications. Further, although illustrated as a single application 2108, the application 2108 can be implemented as multiple applications 2108 on the computer 2102. In addition, although illustrated as integral to the computer 2102, in alternative implementations, the application 2108 can be external to the computer 2102.

The computer 2102 can also include a power supply 2114. The power supply 2114 can include a rechargeable or non-rechargeable battery that can be configured to be either user- or non-user-replaceable. In some implementations, the power supply 2114 can include power-conversion or management circuits (including recharging, standby, or another power management functionality). In some implementations, the power-supply 2114 can include a power plug to allow the computer 2102 to be plugged into a wall socket or another power source to, for example, power the computer 2102 or recharge a rechargeable battery.

There can be any number of computers 2102 associated with, or external to, a computer system containing computer 2102, each computer 2102 communicating over network 2103. Further, the term "client," "user," or other appropriate terminology can be used interchangeably, as appropriate, without departing from the scope of the present disclosure. Moreover, the present disclosure contemplates that many users can use one computer 2102, or that one user can use multiple computers 2102.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A method for creating a perceived motion when one or more images are viewed between a first viewing angle and a second viewing angle, the method comprising:
   accessing a first set of data encoding the one or more images sized and shaped for presentation on a square or rectangular surface;
   providing the first set of data for warping by one or more computer processors such that each of the one or more images is projected onto a respective trapezoidal surface having a first base and a second base that is longer than the first base,
      wherein the first base is arranged to be closer to a viewer than the second base, and
      wherein a first portion of each image is projected further away from the viewer than a second portion of each image; and
   presenting each of the projected one or more images on the respective trapezoidal surface,
      wherein the first portion of each projected image is presented by the first base and the second portion of each projected image is presented by the second base even though the first portion of each projected image is further away than the second portion of each projected image, and
      wherein when the projected one or more images are viewed between the first viewing angle and the second viewing angle, the projected one or more images appear with the perceived motion even though each of the projected one or more images is static.

2. The method of claim 1, further comprising:
   accessing a second set of data encoding each of the projected one or more images for presentation on the respective trapezoidal surface.

3. The method of claim 2, wherein presenting each of the projected one or more images comprises:
   providing the second set of data for printing such that each of the projected one or more images is printed as a respective printout; and
   mounting each respective printout on a corresponding trapezoidal surface.

4. The method of claim 2, wherein presenting each of the projected one or more images comprises:
   displaying each of the projected one or more images as a digital image on the respective trapezoidal surface.

5. The method of claim 1, wherein providing the first set of data for warping comprises:
   submitting the first set of data to one of: a server, or a mobile app.

6. The method of claim 5, wherein said warping comprises:
   causing the one or more processors to perform a transformation that projects each of the one or more images from the square or rectangular surface to the respective trapezoidal surface.

7. The method of claim 4, wherein the respective trapezoidal surface for each of the projected one or more images is sized and shaped to represent portions of a scene where each of the projected one or more images is presented to the viewer.

8. A method for creating a perceived motion when one or more images are viewed between a first viewing angle and a second viewing angle, the method comprising:

accessing a first set of data encoding the one or more images sized and shaped for presentation on a square or rectangular surface;

warping the first set of data such that each of the one or more images is projected onto a respective trapezoidal surface having a first base and a second base that is longer than the first base, wherein the first base is arranged to be closer to a viewer than the second base, and wherein a first portion of each image is projected further away from the viewer than a second portion of the image;

generating a second set of data encoding each of projected the one or more images; and providing the second set of data for presenting each of the projected one or more images on the respective trapezoidal surface.

9. The method of claim 1, wherein providing the second set of data comprises:

transmitting, to a user device, the second set of data; and causing an operator of the user device to present each of the projected one or more images on the respective trapezoidal surface, wherein the first portion of each projected image is presented by the first base and the second portion of each projected image is presented by the second base even though the first portion of each projected image is further away than the second portion of each projected image, and wherein when the projected one or more images are viewed between the first viewing angle and the second viewing angle, the projected one or more images appear with the perceived motion even though each of the projected one or more images is static.

10. The method of claim 8, wherein providing the second set of data for presenting comprises:

printing each of the projected one or more images as a respective print-out; and mounting each respective print-out on a corresponding trapezoidal surface.

11. The method of claim 8, wherein said warping comprises:

performing, using one or more computer processors, a perspective transformation that projects each of the one or more images from the square or rectangular surface to the respective trapezoidal surface.

12. The method of claim 11, wherein accessing the first set of data comprises:

receiving, at the one or more processors and from a user device, the first set of data.

13. The method of claim 11, further comprising:

configuring the respective trapezoidal surface for each of the projected one or more images to represent portions of a scene where each of the projected one or more images is presented to the viewer.

14. The method of claim 8, wherein each of the projected one or more images is one of: a digital image, or a physical photograph.

15. A picture frame for creating a perceived motion when one or more images are viewed between a first viewing angle and a second viewing angle, the picture frame comprising:

at least one trapezoidal surface, each having a first base and a second base, wherein each trapezoidal surface is sized and shaped to present a corresponding one of the one or more images projected thereon, wherein the first base of each trapezoidal surface is arranged to be closer to a viewer than the second base of each trapezoidal surface, wherein a first portion of the corresponding one of the projected one or more images is further away from the viewer than a second portion of the corresponding one of the projected one or more images, and wherein the first portion of the corresponding one of the projected one or more images is presented by the first base and the second portion of the corresponding one of the projected one or more images is presented by the second base even though the first portion of the corresponding one of the projected one or more images is further away than the second portion of the corresponding one of the projected one or more images such that when the projected one or more images are viewed between the first viewing angle and the second viewing angle, the projected one or more images appear with the perceived motion even though each of the projected one or more images is static.

16. The picture frame of claim 15, wherein the picture frame is sized and shaped to represent a scene where the projected one or more images are presented to the viewer.

17. The picture frame of claim 16, wherein the scene comprises:

at least one framed panel, each framed panel incorporating a corresponding one of the at least one trapezoidal surface; and at least one region representing an intervening structure, wherein the intervening structure is further away from the viewer than the first portion of the corresponding one of the projected one or more images, wherein the intervening structure is presented on a flat surface closer to the viewer than the first portion of the corresponding one of the projected one or more images, and wherein the at least one trapezoidal surface is not co-planar with respect to the flat surface of the intervening structure.

18. The picture frame of claim 17, wherein each of the projected one or more images is mounted on a corresponding one of the at least one trapezoidal surface such that a front side of each of the projected one or more images faces the viewer.

19. The picture frame of claim 18, wherein the at least one trapezoidal surface comprises metal dots so that the corresponding one of the projected one or more images can be mounted using one or more magnets from a back side of the corresponding one of the projected one or more images.

20. The picture frame of claim 15, wherein the at least one trapezoidal surface comprises more than one trapezoidal surfaces, and wherein at least one of the more than one trapezoidal surfaces is not co-planar with respect to another of the more than one trapezoidal surfaces.

* * * * *